(12) United States Patent
Miklos et al.

(10) Patent No.: US 7,933,600 B2
(45) Date of Patent: Apr. 26, 2011

(54) SMOOTH HARD HANDOVER METHOD, MOBILE STATION AND BASE STATION ADAPTED FOR THE METHOD

(75) Inventors: Gyorgy Miklos, Budapest (HU); Andras Racz, Budapest (HU)

(73) Assignee: Telefonaktiebolaget LM Ericsson (publ), Stockholm (SE)

( * ) Notice: Subject to any disclaimer, the term of this patent is extended or adjusted under 35 U.S.C. 154(b) by 1167 days.

(21) Appl. No.: 11/570,613

(22) PCT Filed: Jun. 15, 2004

(86) PCT No.: PCT/SE2004/000981
§ 371 (c)(1),
(2), (4) Date: Dec. 14, 2006

(87) PCT Pub. No.: WO2005/125260
PCT Pub. Date: Dec. 29, 2005

(65) Prior Publication Data
US 2008/0280611 A1     Nov. 13, 2008

(51) Int. Cl.
*H04W 88/02* (2009.01)
(52) U.S. Cl. ........................................ 455/436
(58) Field of Classification Search .................. 455/436, 455/88, 525, 432.1, 437, 438, 439, 440, 441, 455/442
See application file for complete search history.

(56) References Cited

U.S. PATENT DOCUMENTS

| | | | |
|---|---|---|---|
| 5,533,014 A * | 7/1996 | Willars et al. ................. | 370/335 |
| 5,778,075 A * | 7/1998 | Haartsen ....................... | 380/272 |
| 6,216,004 B1 | 4/2001 | Tiedemann | |
| 6,577,868 B1 | 6/2003 | Vialen | |
| 7,190,957 B2 * | 3/2007 | Okawa et al. ................. | 455/436 |
| 2002/0013147 A1 * | 1/2002 | Fauconnier et al. .......... | 455/422 |
| 2003/0013443 A1 | 1/2003 | Willars | |
| 2004/0023693 A1 * | 2/2004 | Okawa et al. ............... | 455/562.1 |
| 2007/0191013 A1 * | 8/2007 | Gunnarsson et al. ......... | 455/438 |

FOREIGN PATENT DOCUMENTS

| | | |
|---|---|---|
| EP | 1231808 A2 | 8/2002 |
| WO | WO 0101720 A1 | 1/2001 |

* cited by examiner

*Primary Examiner* — Diane Mizrahi

(57) ABSTRACT

The present invention relates to a cellular radio communications system and especially a method, a mobile station and a base station for a smooth hard handover. The smooth hard handover includes preparing radio links in selected base stations for potential communication with a mobile station. This is similar to selecting base stations for the active set in the prior art soft handover. A difference is though that just one radio link is actively used for transmission. The handover from the active to a prepared radio link is quick and safe, as compared to conventional hard handover, because of the preparation, while requiring a less complex system architecture then the conventional soft handover. The smooth hard handover can replace the soft handover.

6 Claims, 27 Drawing Sheets

| Message | From -> To | Carried information |
|---|---|---|
| PREPARATION SET UPDATE<br>PREPARATION SET UPDATE CONFIRM | RNC->UE or<br>UE->NodeB (in scenario without central node) | - radio link parameters<br>- which link to setup and to release |
| FORWARD PREP. SET UPDATE<br>FORWARD PREP. SET UPDATE CONF. | NodeB->NodeB (only in scenario without central node) | - the original PREPARATION SET UPDATE message |
| LINK ACTIVATE<br>LINK ACTIVATE CONFIRM | RNC->UE,<br>UE->NodeB (in scenario without central node) | - the ID of the radio link to activate<br>- radio parameters necessary for the activation |
| FORWARD LINK ACTIVATE<br>FORWARD LINK ACTIVATE CONFIRM | NodeB->NodeB (only in scenario without central node) | - the original LINK ACTIVATE message |
| LINK DEACTIVATE<br>LINK DEACTIVATE CONFIRM | RNC->UE,<br>UE->NodeB (in scenario without central node) | - the ID of the radio link to deactivate |

Fig. 21a

| Message | From -> To | Carried information |
|---|---|---|
| FORWARD LINK DEACTIVATE<br>FORWARD LINK DEACTIVATE CONF. | NodeB->NodeB (only in scenario without central node) | - the original LINK DEACTIVE message |
| CPHY-RL-Prepare REQ<br>CPHY-RL-Prepare CNF | RNC->NodeB, inside UE, inside NodeB (in scenario without central node) | - radio link parameters |
| CPHY-RL-Release REQ<br>CPHY-RL-Release CNF | RNC->NodeB, inside UE, inside NodeB (in scenario without central node) | - the ID of the radio link to release |
| CPHY-RL-Activate REQ<br>CPHY-RL-Activate CNF | RNC->NodeB, inside UE, inside NodeB (in scenario without central node) | - the ID of the radio link to activate<br>- additional radio link parameters |
| CPHY-RL-Deactivate REQ<br>CPHY-RL-Deactivate REQ | RNC->NodeB, inside UE, inside NodeB (in scenario without central node) | - the ID of the radio link to deactivate |

Fig. 21b

SMOOTH HARD HANDOVER METHOD, MOBILE STATION AND BASE STATION ADAPTED FOR THE METHOD

TECHNICAL FIELD OF THE INVENTION

The present invention relates to a cellular radio communications system and especially a method, a mobile station and a base station for smooth hard handover.

DESCRIPTION OF RELATED ART

WCDMA (Wideband Code Division Multiple Access) is a cellular radio communications system standardised by 3GPP. A network based in CDMA standard normally comprises some RNCs (Radio Network Controllers), and a greater number of base stations. The base stations provide radio service for mobile stations in respective geographical areas called cells. The cells may partly overlap. The RNCs control a respective group of base stations and have connections to a core network for setting up communication from a mobile station via a base station, and the RNC itself to the core network for further connection.

When the user of the mobile terminal is moving while having a connection to another terminal, the RNC controls that the right base station provides the radio link to the mobile station. This may include change of the base station, during the connection and that is referred to as handover.

WCDMA supports soft handover, which means that more than one base station provides the mobile station with a radio link. When a radio link is released there is always at least one other radio link established over a corresponding base station that support the communication. The group of radio base stations providing links in parallel to the same mobile station are named active set in the WCDMA standard. An advantage of the soft handover is that the connection to the mobile station is safe, and provides good quality. A disadvantage is though it is very complicated to implement. The parallel links are not only necessary over the radio link but are also needed within the fixed network to a central connecting and splitting point. The parallel links also occupies double or triple transmission resources, depending on the number of parallel links.

Hard handover is an alternative to the soft handover and by which is meant that communication over the old link is stopped before the new radio link is established. Hard handover is easier to implement than the soft handover and is used in first and second generation cellular networks while also being supported by the third generations standards as WCDMA. A disadvantage is though that the end users are disturbed by the interruption caused by the handover. This is especially the case when the delay is long before the new link is established. An additional disadvantage is that the new link occasionally may not be established after the release of the old link. Because of these disadvantages, it should be avoided to perform hard handovers frequently. Accordingly, the hard handover is not performed until the target base station performs a certain level better quality than the old base station. Until the level is hit, the mobile station may cause interference on the radio spectrum because it is not under control of the optimum base station.

SUMMARY OF THE INVENTION

The present invention addresses the hard handover problem of delay until the new radio link can be established and the resulting interruption of the communication.

The present invention solves the problem by setting up a two or more radio links over respective base stations with a mobile station similar to the case of soft handover. However, active transceiving is made over one of the radio links, while the other radio links setup between the mobile station and the other one or more radio base stations are prepared for transmission. The radio link used for transceiving can then be rapidly changed to any of the prepared radio links when the mobile station is handed over to a second base station from a first base station.

The process of keeping a number of prepared radio links over a set of base station is made similar to the set up of an active set of base stations. However, it is a process separated from the handover itself. Candidates for the handover are though only the set of base stations providing prepared radio links.

An advantage of the present invention is that the handover from a first to a second base station is fast and that the user experiences high quality of the reception. Moreover, the handover is safe because the chance of succeeding with establishing active communication is high when the radio link has been prepared. For this reasons the smooth hard handover can advantageously replace the soft handover process.

When compared to the soft handover it is an advantage of the present invention that no splitter combiner node is needed in the network. The network architecture can thus be simplified and also less transmission capacity in the network is needed. The splitting and combiner node needed in the soft handover case also results in long delays in case data need to be retransmitted. Consequently, also retransmission delays will decrease with the smooth hard handover.

DESCRIPTION OF THE DRAWINGS

FIGS. 21a and 21b is a table of modified messages and their content.

DESCRIPTION OF PREFERRED EMBODIMENTS

Figure 1:
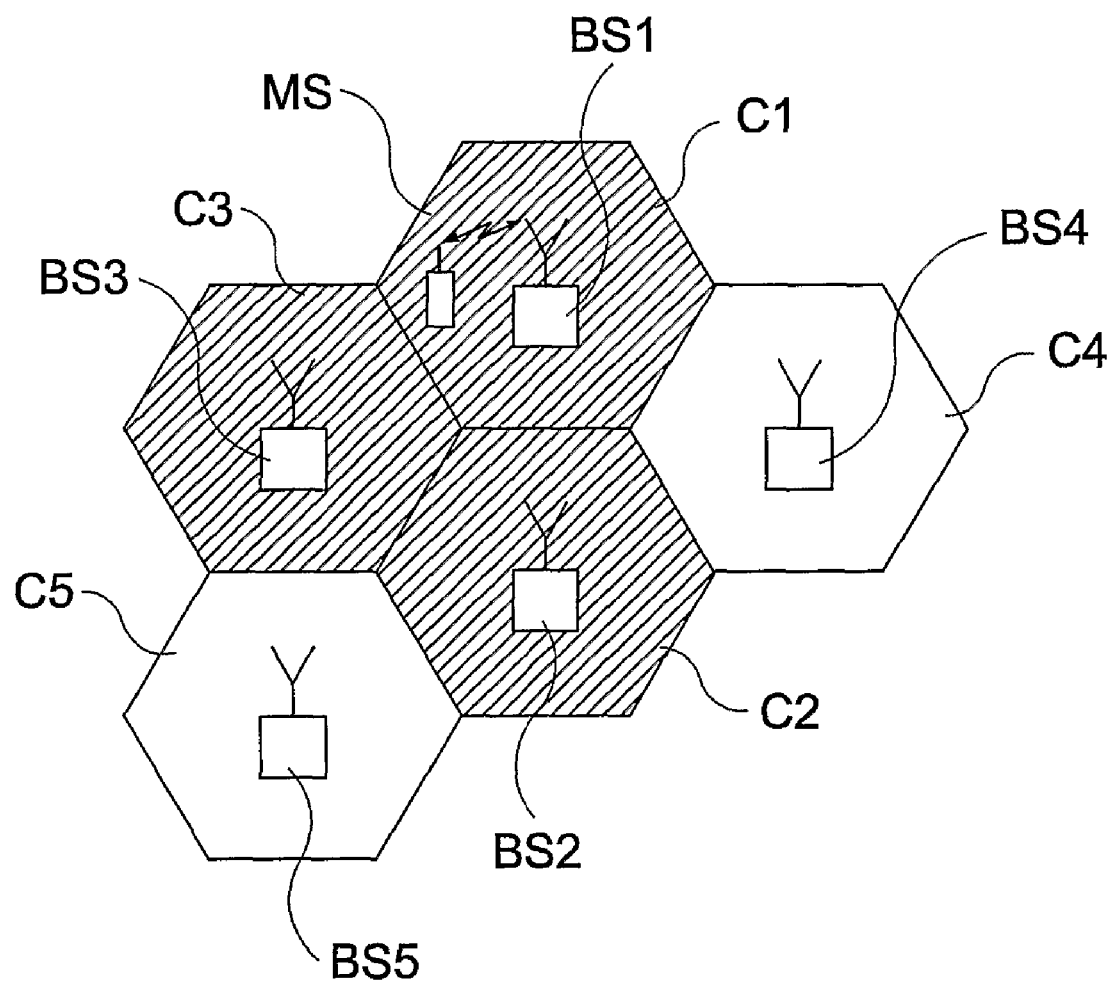
FIG. 1 block diagram illustrating cells and base stations.

FIG. 1 is a schematic view of base stations BS1-BS5 supporting respective cells C1-C5 with radio communication. In real radio communication system the cell boarders are not distinct and coverage of the various cells overlap. A mobile station MS is also disclosed in FIG. 1 with an active radio link set up with a first radio base station BS1. A group of the cells C1-C3 that are hatched marked in FIG. 1 will be described further in connection with the method of FIG. 2.

Figure 2:
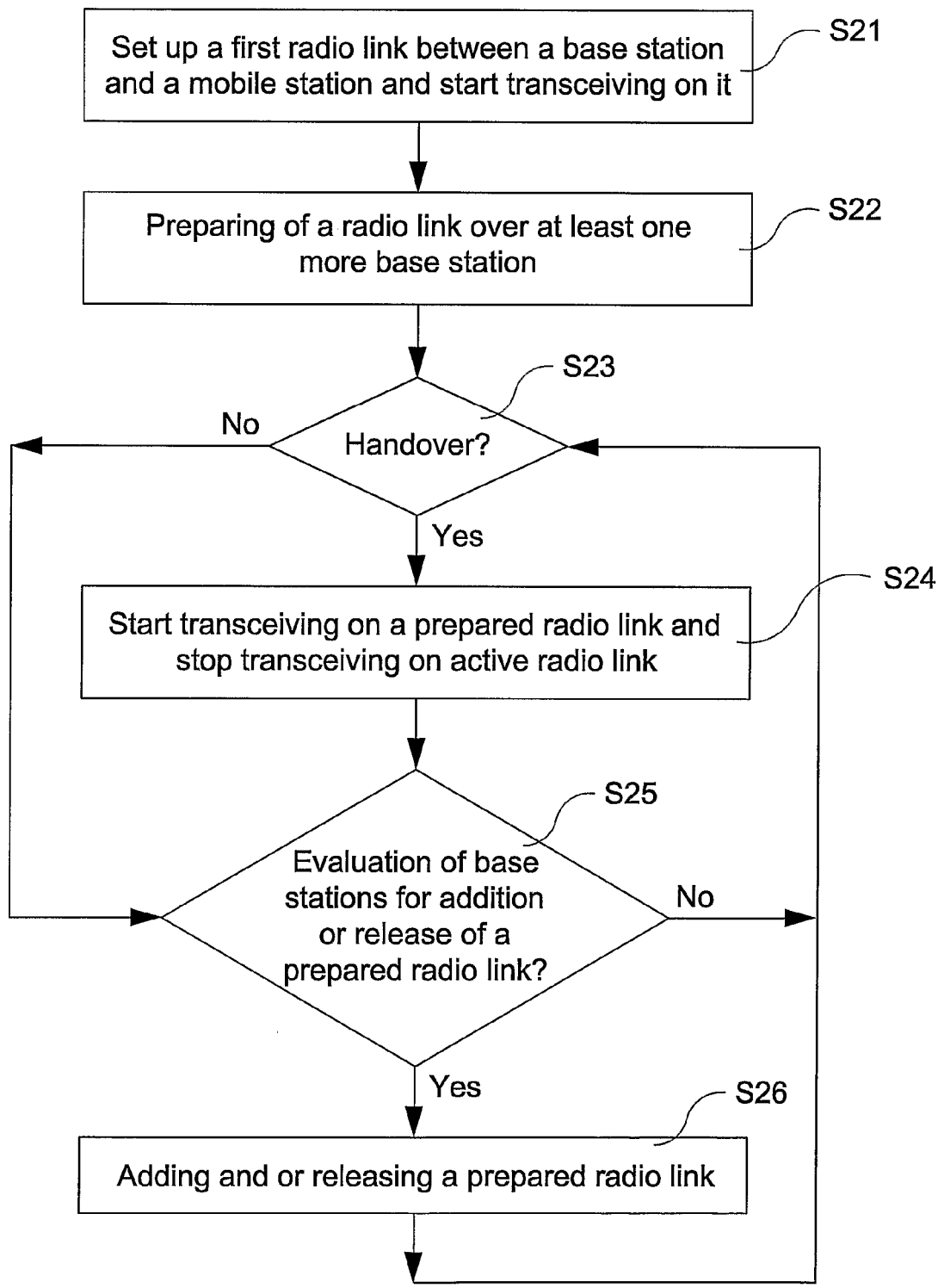
FIG. 2 flowchart of an inventive method.

FIG. 2 discloses an inventive method of smooth hard handover. In a first step S21, a first radio link is set up between a base station and a mobile station and transmission is started over the radio link, for example the first base station BS1 and the mobile station MS of FIG. 1. The radio link used for the transmission is referred to as the active radio link.

While transceiving on the active radio link the mobile station MS makes measurements on base stations BS2-BS5 neighbouring the first base station BS1. If the signal strength from one or more of the radio base stations BS2-BSS5 measured are strong enough, a radio link is prepared between the mobile station MS and the base station BS2-BS5, see the second step S22 of FIG. 2. In the prepared state the radio link is established, synchronization is obtained but it is not activated, which means that it is not used for actual data transmission. The base stations supporting a radio link, active or prepared, with the mobile station MS are referred to as a preparation-set. In the example, the first, second and third base stations BS1-BS3 are assumed to form a preparation set and hence their respective cells C1-C3 are hatched marked in FIG. 1.

The preparation of the radio link, in the second step S22, is made similarly to the set up of a diversity soft handover link, whereas no transmission or reception of user data is made in the mobile station MS or in the second and third base stations BS2, BS3 supporting the prepared radio links.

In a third step, S23, the radio quality of the active radio link is evaluated and compared to the estimated radio link quality of the one or more prepared radio links. Handover is decided according to pre-determined thresholds of the qualities.

Should the evaluation in the third step S23 result in handover being decided to another of the preparation set base stations BS2, BS3, for example the second base station BS2, transceiving is started on the new active radio link supported by the second base station BS2 and transceiving on the radio link supported by the first base station BS1 is stopped, according to a fourth step S24. The handover involves a switch in the fixed network transmission links for transmission via a second radio base station when the communication is handed over from the first base station, as is the case for hard handovers. Unlike the conventional hard handover, transmission in the direction to the mobile station MS may start from the target base station before it has ceased from the old base station. This optional of two base stations transmitting in parallel during the handover differs from the conventional soft handover in that the two base stations transmit different user data. The old base station transmits user data that it has received for transmission and buffered until radio transmission recourses are available, while the target radio base station starts transmission as soon as it receives user data.

After the evaluation of preparation-set base stations BS1-BS3 for handover in the third step S23 and the possible handover of the fourth step S24, follows the fifth step, S25, of evaluating and selecting base stations for the preparation set. The evaluation and selection are preferably made in the same way as when active-set base station are selected in the case of soft handover. Candidates for being added to the preparation set are neighbour base stations BS4-BS5 to the preparation set base stations BS1-BS3.

If a change of base station BS2-BS5 in the preparation-set is decided in the fifth step, S25, step six S26 follows and in case of a base station BS4, BS5 being added, a radio link with it is prepared or in case base station BS2, BS3 is omitted its prepared radio link is released.

After the sixth step S26, or in case of no change of preparation-set being decided in the fifth step S25, the third step S23 of evaluating and deciding on a possible handover is repeated. The third to sixth steps S23-S26 are then repeated in a loop as long as the communication with the mobile station MS continues.

The process of selecting, adding or removing base stations BS1-BS3 to and from the preparation-set as disclosed in the second, fifth and sixth step S22, S25, S26 is similar to that of selecting, adding or removing base station to and from an active set in the prior art soft handover case with the exception of adding a base station to the active set implies soft handover while adding of a base station to the preparation-set does not involve any handover just a radio channel being prepared. The smooth hard handover of the third and forth steps S23, S24 is a separate process from that of controlling the preparation set, however, only base stations BS1-BS3 within the preparation set are candidates for handing over the active radio link.

In the process of evaluating the preparation-set base stations BS1-BS3 for a possible handover, e.g. the third step S23, measurements are frequently made in the mobile station MS on the prepared radio links with the preparation-set base stations BS1,BS2 or alternatively on the pilot channels of the preparation-set base stations BS1-BS3 and in the preparation-set base stations BS1-BS3 on the uplink radio channel from the mobile station MS. The measurements are accurate and occupy resources in the preparation-set base station BS1-BS3 as well as in the mobile station MS. The number of preparation-set base stations BS1-BS3 should be limited for example to three. Hence, selection of base station also involves release of base stations BS1-BS3 from the preparation set.

In communications system bases on CDMA technology, such as WCDMA a physical channel is characterised by the spreading code used by the transmitter. When the radio link is handed over to a new base station, the physical channel used in the direction from the base station to the mobile station change. The mobile station MS may, however, continue to transmit on the same physical channel when the radio link is served by the new base station as it did before the handover.

Of course, different parts of the procedure described by the flowchart in FIG. 2 can be implemented either in the mobile station or in network elements, such as the base station or central node.

The smooth hard handover can advantageously be made more frequently that the ordinary hard handover because it is quick and safe. In order to avoid too frequent hard handovers the target base station generally need to provide a radio quality a certain level degree better than that of the serving base station. This causes a risk that the mobile station adversely interferes with the traffic in the target cell until the prior art handover is finalised. One reason for this is that only the base station supporting the active radio link can regulate the transmit power of the mobile station MS. With the smooth hard handover of the present invention, handover can be made more frequent and rapidly and hence uplink interference reduced in base stations providing a prepared radio link with the mobile station MS.

The smooth hard handover procedure of FIG. 2 can be implemented in various radio communications systems, cellular system as well indoor systems.

When the method is implemented in a WCDMA system, a radio link in the prepared state, i.e. prior to being in active state, have a dedicated physical control channel set up but not a dedicated physical data channel. Control information sent on the dedicated physical control channel is used to keep the prepared radio link synchronized and keep track of correct power levels. The dedicated physical channel need be set up only in the downlink direction i.e. from the base station to the mobile station. When the radio link enters the active state, the dedicated physical control channel is maintained and the dedicated physical data channel is set up.

When applying the WCDMA terminology, the term transmitting, receiving or transceiving on a radio link always refers to the transmission, reception of user data on a dedicated physical data channel and hence implies an active state radio link. However, transmission, reception of physical layer control information may be also ongoing in case of prepared state radio links on the dedicated physical control channel.

Prior Art WCDMA Architecture

Figure 3:
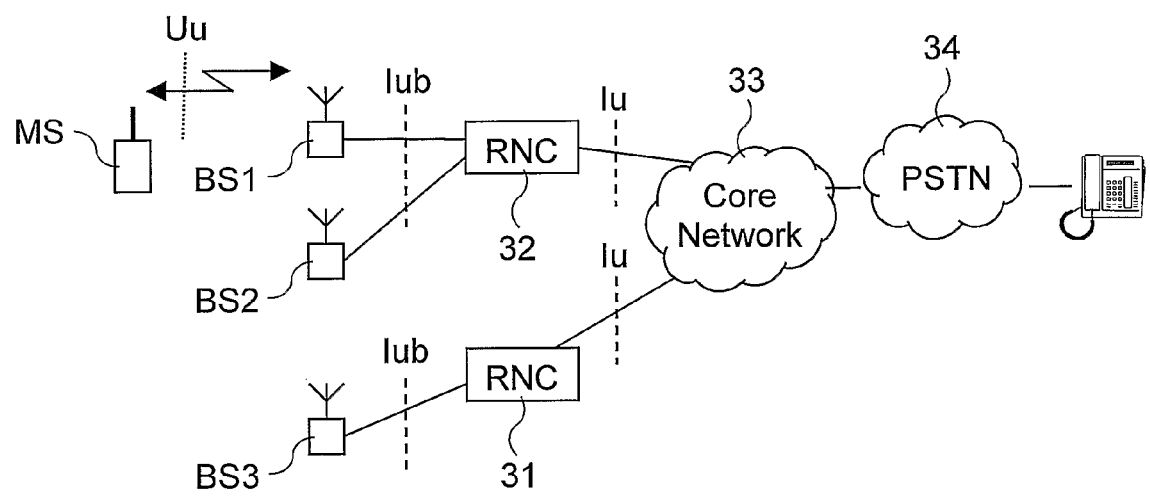
FIG. 3 a view over WCDMA RAN architecture.

Further detailed embodiments on the signalling between the network nodes and the base station will be given with the invention as employed in a WCDMA (Wideband Code Division Multiple Access) system standardised by 3GPP. Because the 3GPP standard uses other words for several nodes than what is used when speaking of cellular radio systems in general, the 3GPP specific wordings or abbreviations will be used in the disclosure of the WCDMA implementation of the present invention. This will be made also with reference to FIG. 3 that is a schematic view of some basic nodes of the WCDMA system well known before the priority date of the present patent/application. It should be noted that the nodes and interfaces are described for the purpose of ease the understanding of the present invention and may not be complete. FIG. 3 discloses a mobile station MS which is named User Equipment and abbreviated UE in 3GPP standard. In the further description UE will be used for the WCDMA mobile station and MS is the reference sign to the FIG. 3. Base stations BS1-BS3 are named NodeB in the WCDMA standard and thus will be named so also in the further description while the reference signs BS1-BS3 are used with reference to FIG. 3. Two radio network controller 31, 32 abbreviated RNC 31, 32 controls the radio link set up of a respective plurality of connected NodeBs BS1-BS3 over respective Iub interface and makes connections to other RNCs 31, 32 over the Iur interface. The RNCs 31, 32 have an Iu interface for set up of communication links to the core network 33 for further links to other radio networks or to other types of networks such as a Public Switched Telephone Network PSTN 34. A radio link is set up between the UE MS and one or more NodeB over the Uu interface.

Should the UE MS have started the communication over a NodeB BS4 under the control of a first of the RNCs 31 and then during communication being handed over to a NodeB BS1-BS3 under the control of a second of the RNCs 32, both RNCs will remain some control of the communication. The first of the RNCs 31 will act as a SRNC (Serving Radio Network Controller) for the communication link with the UE MS and be responsible for its connectivity with the core network 33. The second RNC 32 acts as a DRNC (Drift RNC) for the communication with the UE MS and support the SRNC 31 with communication link via any of the base stations BS1-BS3 under its control. Should no handover be made from the NodeBs under the control of the SRNC 31 it also takes the responsibilities as a DRNC.

Prior Art Signalling Procedures in WCDMA

The relevant signalling charts of the standardised procedures will initially be described for understanding of the difference of the signalling schemes of the present invention when it is described further down.

Prior Art Soft Handover Signalling

Figure 4:
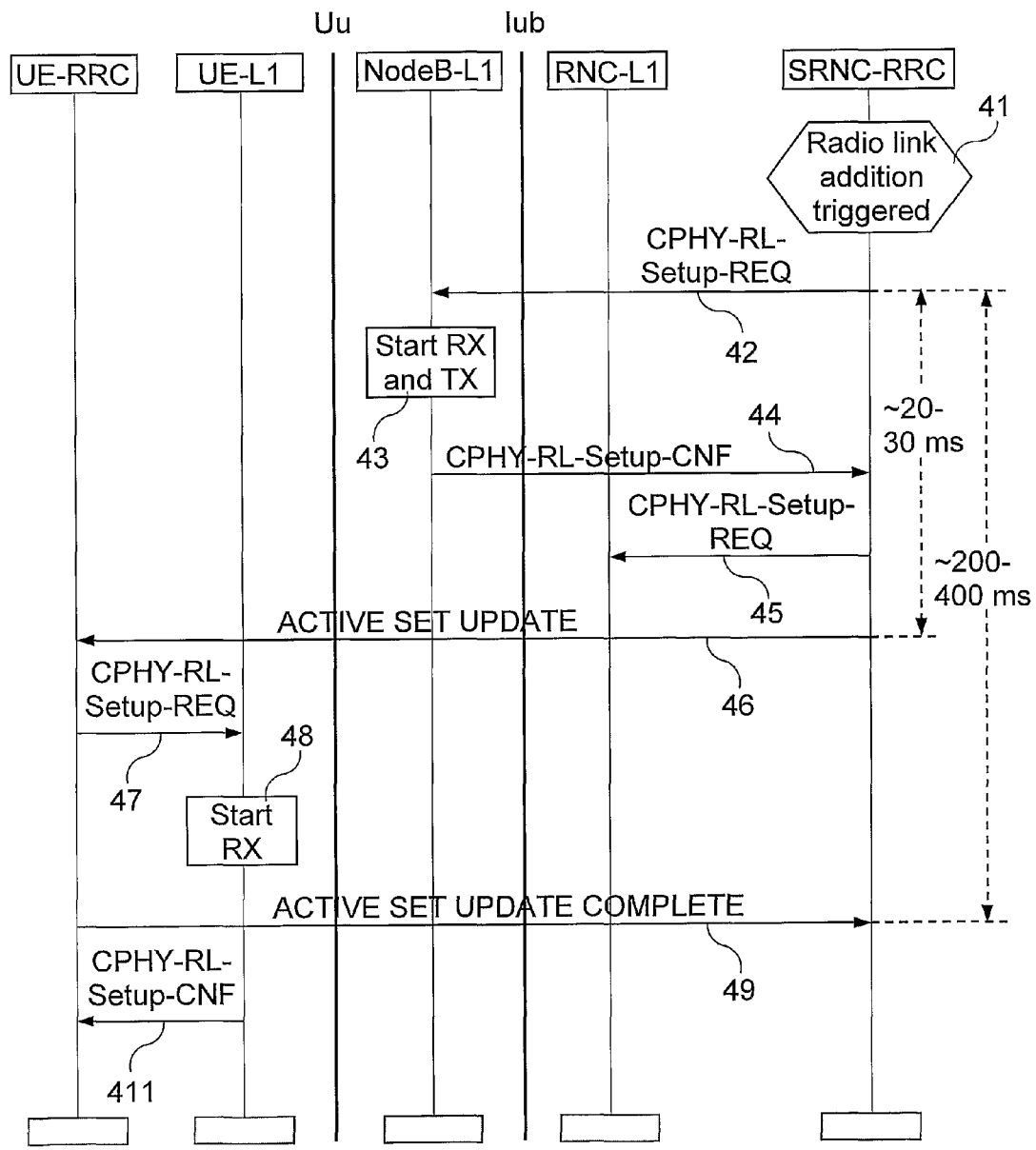
FIG. 4 is a chart of the signals transmitted during the radio link addition according to a prior art soft handover.

FIG. 4 is chart of the messages sent between the RNC 31, the NodeBs and the UE during the soft handover procedure of adding a new NodeB to the active set and that includes setting up an active radio link between the added NodeB and the UE. The performance of the UE, the NodeB and the RNC 32 are under the control of software programs and that is organised in protocol stacks with different layers of the stacks handling corresponding functions in the communication. Accordingly, the messages sent between the three nodes are handled by different protocol layers in the nodes. The protocol layers receiving or initiating a message is indicated in the message chart of FIG. 4. These protocol layers are L1 e.g. layer 1 or the physical layer in the UE, the NodeB and the RNC and the RRC (Radio Resource Control layer) relevant for the UE and the RNC. Moreover, should separate RNCs act as DRNC and SRNC, L1 functions and signalling are handled by the DRNC while the RRC-layer functions and signalling are handled by the SRNC.

The transmission of messages proceeds from top downwards in FIG. 4, and is initiated by the RNC determining that a new NodeB shall be added to the active set NodeBs. The RNC determination is based upon measurements made by the UE on NodeBs neighbouring the active set NodeBs and that are reported to the RNC.

The initial determination 41 of soft handover is indicated in FIG. 4. The signalling procedure then starts by the SRNC-RRC sending the new NodeB L1 a command 42 to start transceiving on a specified radio channel by the message CPHY_RL-Setup-Req. The NodeB immediately starts transceiving 43 and confirms this by sending 44 a CPHY-RL-Setup-CNF message to the RNC-RRC. Then the RNC-RRC instructs 45 its own L1 to open a user data connection for the channel with the new NodeB by sending the command CPHY_RL-Setup-Req to RNC-L1. Next the RNC-RRC commands 46 the UE-RRC to add the new NodeB to the active set by an Active Set Update command. Upon receipt of this command the RRC-layer of the UE commands 47 the UE-L1 to start receiving 48 on the radio link from the new NodeB by a message CPHY-RL-Setup-REQ. The UE confirms 49 to the RNC-RRC that the reception from the new NodeB is started by sending an Active Set Update Complete message. The UE-L1 also confirms 411 reception on the channel from the new NodeB by sending to UE-RRC a message CPHY-RL-Setup-CNF.

Adding the new NodeB includes start of both transmission and reception in the NodeB, while only reception is started in the UE MS. The reason is that the uplink channel from the mobile station is characterised by one spreading code that is decoded by all the active set NodeBs. In the downlink, the active set NodeBs uses separate scrambling codes characterising respective downlink channels. The UE receives the respective downlink channels separately.

The delays that are associated with certain parts of the soft handover procedure are also indicated in the FIG. 4 signalling chart. The first part of the procedure when the new radio link is setup in the NodeB BS and in the RNC 32 takes roughly 20-30 ms, which is not significant. The overall delay of the procedure from the point when the decision is made in the RNC until the active set update is acknowledged by the UE is roughly 200-400 ms.

Prior Art Hard Handover

Figure 5A:
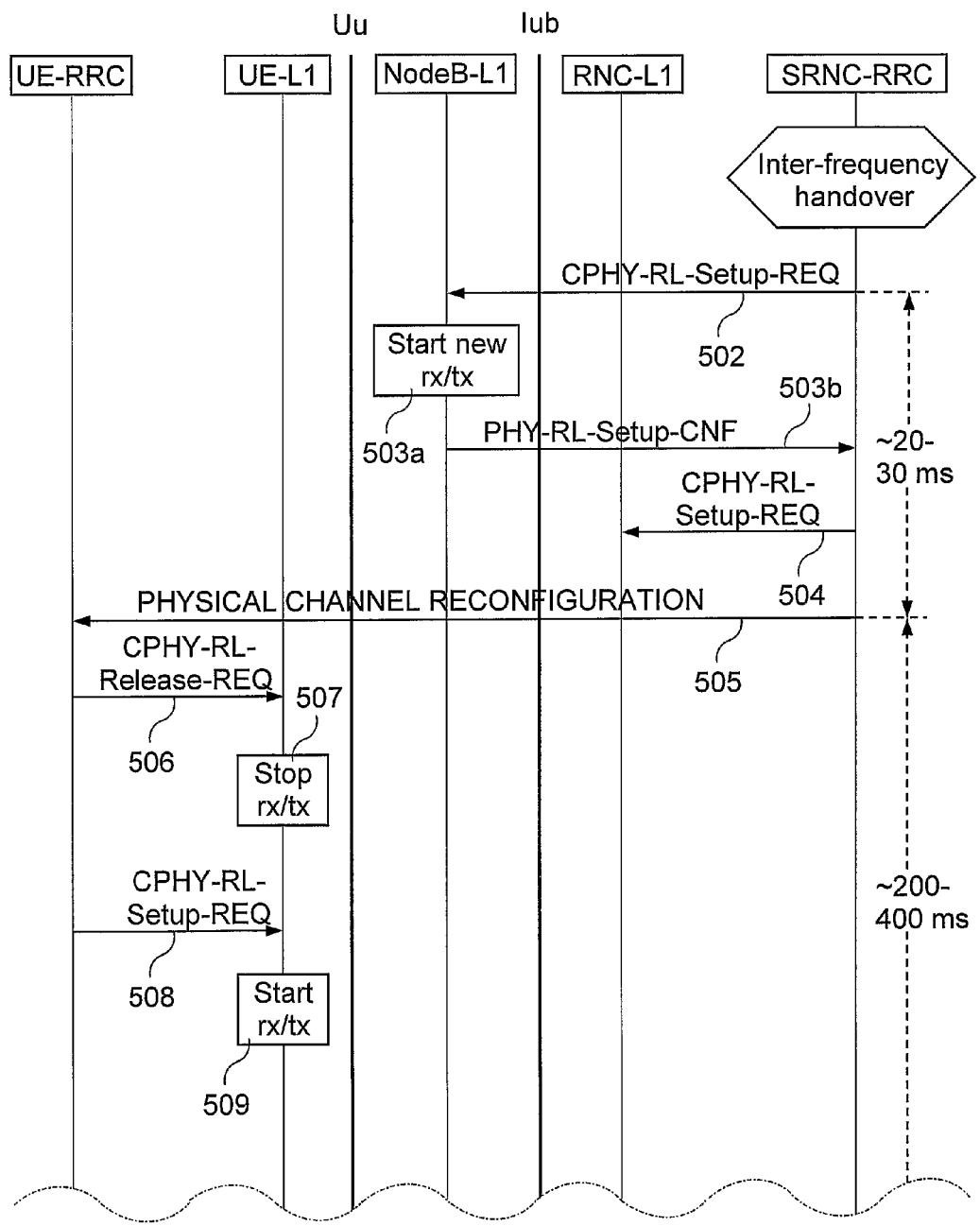
FIGS. 5a and 5b are one chart, split over two pages, of signals sent during the prior art hard handover.
Figure 5B:
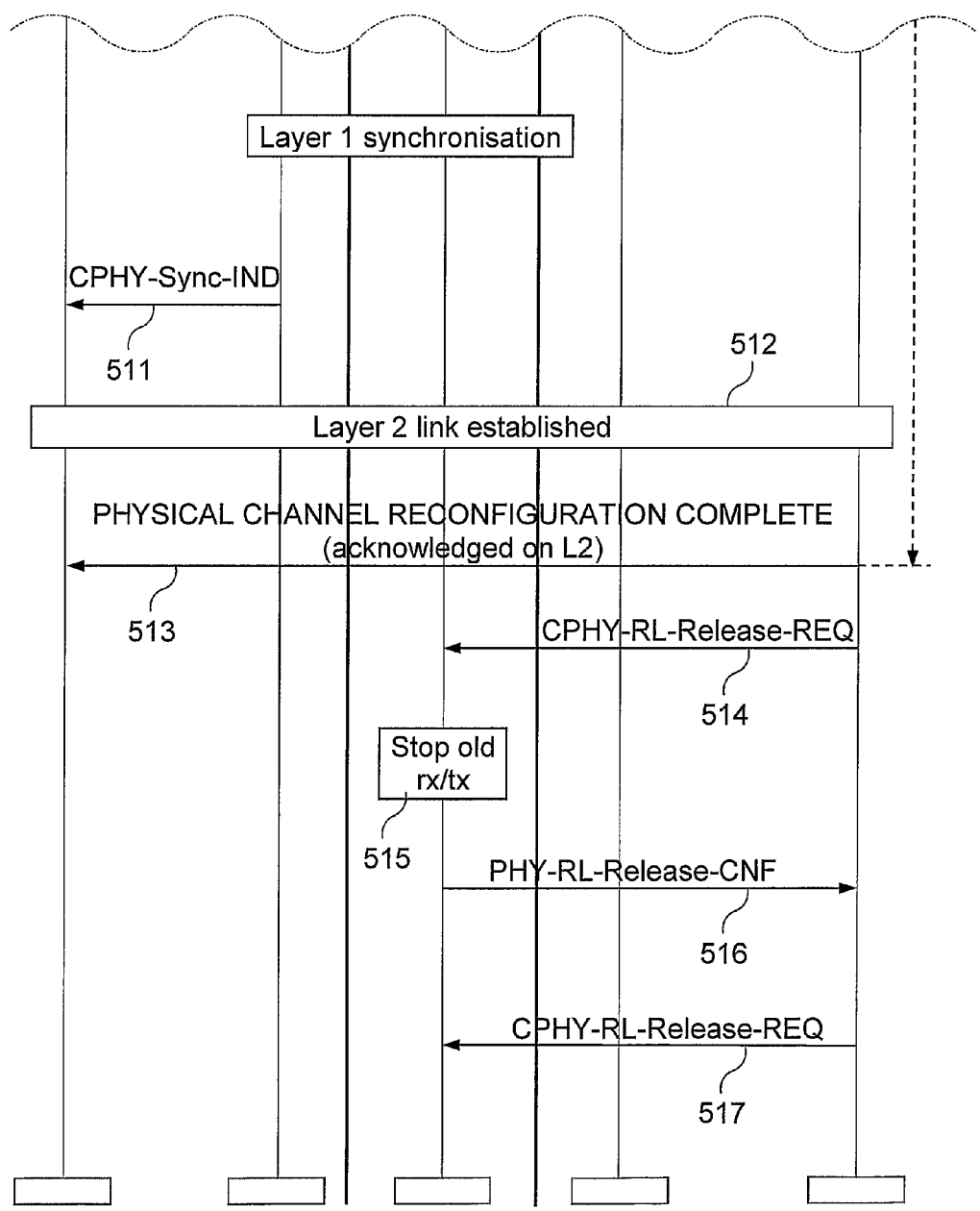

The prior art hard handover message scheme will now be described with reference to FIGS. 5a and 5b. The signalling nodes and protocols of FIGS. 5a and 5b are the same as in FIG. 4 and that are described above. The exchange of messages starts in FIG. 5a by an inter-frequency handover being determined 501 by the SRNC.

Initially transmission and reception in the new NodeB is started by the RNC-RRC commanding 502 the new NodeB by a message CPHY-RL-Setup-REQ. The transmission and reception is started 503a immediately and the new NodeB confirms 503b this by sending the RNC-RRC a message CPHY-RL-Setup-CNF. Next the RNC-RRC requests 504 the RNC-L1 to open a radio link with the new NodeB with the command CPHY-RL-Setup-REQ. Then the RNC-RRC command 505 the UE to perform the hard handover by sending a Physical Channel Reconfiguration command to the UE-RRC. The UE-RRC commands 506 the UE-L1 to stop transceiving 507 on the radio link supported by the previous NodeB by the message CPHY-RL-release-REQ and next commands 508 the UE-L1 to start transceiving 509 on the radio channel supported by the new NodeB. The further process is continued in FIG. 5b. Before communication can be started over the new radio link the UE needs to perform 510 L1 synchronisation and reestablishment 512 of the L2 connection. This involves control that packets are not lost during the handover. When the L1 synchronisation and L2 reestablishment is completed the UE-RRC informs the RNC-RRC on this by sending 513 a message Physical Channel Reconfiguration Complete to the layer 2 signalling protocol of the RNC. The RNC-RRC then starts release of the radio link supported by the previous NodeB by sending 514 a CPHY-RL-Release-REQ. The previous supporting NodeB then stops transceiving on the radio link and confirms 516 this to the RNC-RRC by the command CPHY-RL-Release-CNF. Last the RNC-RRC commands 517 the RNC-L1 to release the link over Iub to the previous NodeB.

To the right of the signalling scheme in FIGS. 5a and 5b are indicated the estimated times for setting up the new radio link in the new NodeB and in the UE and that, to the knowledge of the inventors, are not made public known before the priority date of this patent/application. Notably the time for setting up the radio link in the UE is expected to be considerably longer than 200-400 ms while the time for setting up the link in the NodeB is approximately 20-30 ms. The reasons for the long time of setting up the UE radio link are the L1 synchronisation and the L2 connection reestablishment. The delay inversely effects the end users perception of the communication link.

Embodiments of the Present Invention as Implemented in Standardised WCDMA Architecture Having RNC Terminated Radio Protocols According to WCDMA standard at the priority date of this patent/application radio protocols are terminated in the RNC.

In the embodiments following it is assumed that the radio protocols are terminated in the RNC as is standardised for WCDMA at the priority date of the present patent/application. The architecture assumed is that sketch in FIG. 3.

Control of the Preparation Set

Figure 6:
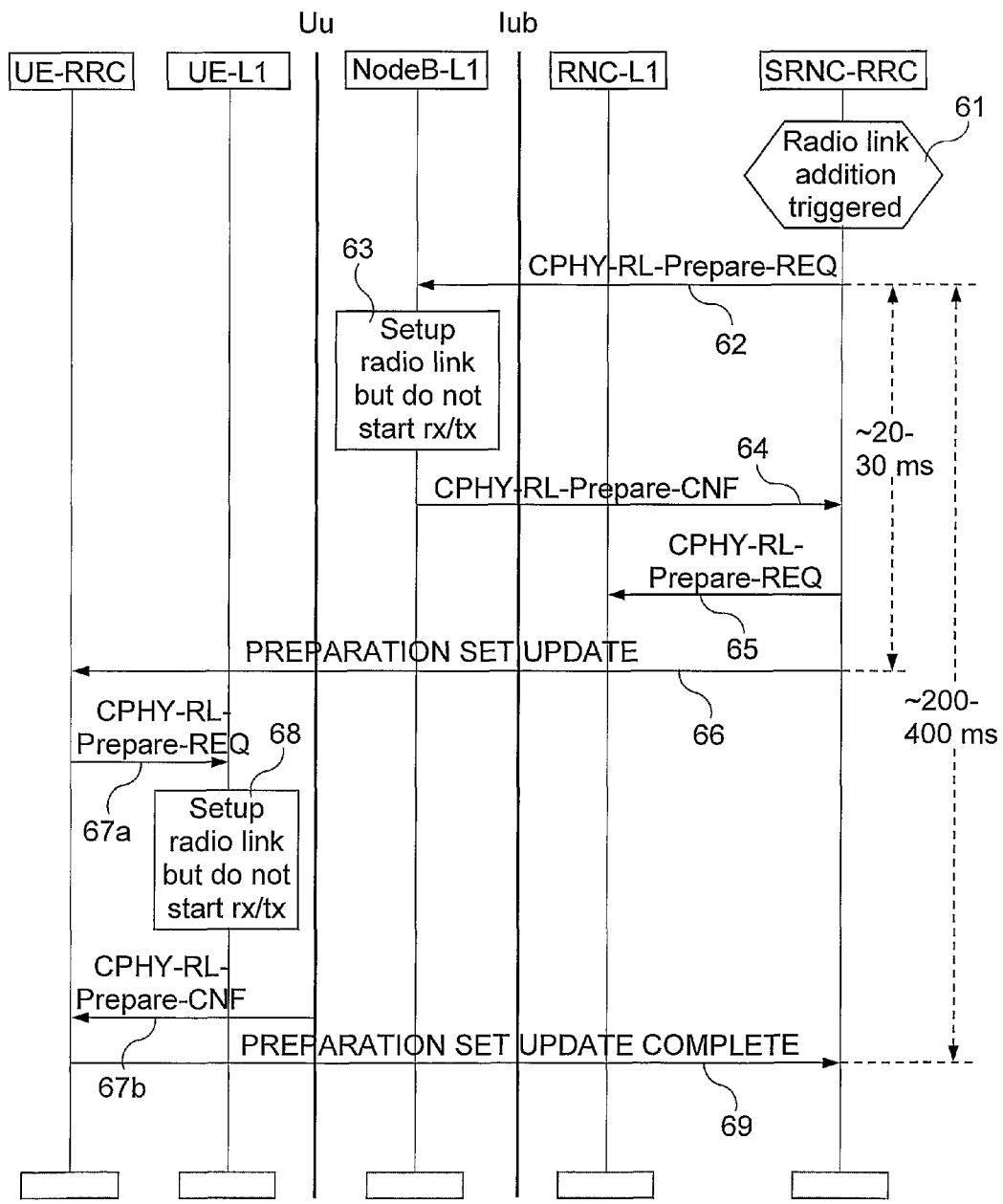
FIG. 6 is a chart of signals sent during the prior art soft handover link addition.

FIG. 6 is chart of the messages sent during the process of adding a new radio link to the preparation set, and that corresponds to the preparation of a radio link in the second and sixth step S22, S26 in the method described with reference to FIG. 2. The order in which messages are sent is basically the same as for the prior art link addition in the soft handover case, described above with reference to FIG. 4. The main difference is that the radio link setup should not imply the start of reception and transmission in the NodeB or in the UE. Therefore, the messages are modified, and "Prepared" is added to the names of the modified messages 62, 64, 64, 67a, 67b sent between the RNC and the NodeB and internally in the UE and RNC between the different protocol layers. In the direction from the RNC to the UE the modified messages is Preparation Set Update 66 that indicates to the UE what radio channels that shall be added to the preparation set and in the opposite direction the Preparation Set Update Complete 69 that indicates that the UE has set up the new radio link without active reception on it.

In the message charts the activity of "Setup radio link" and "Release radio link" refer to setting up and releasing a prepared radio link, that is, setting up and releasing a control channel in the direction from the NodeB to the UE. The "Start rx/tx" and "Stop rx/tx" refer to the activation and deactivation of a data channel corresponding to the control channel that has been set up during preparation, that is, to start transceiving actual user data. The start and stop rx/tx have this meaning all signalling diagrams of the application.

The delays associated with the link addition are expected to be roughly the same as in case of soft handover (~200-400 ms).

The synchronization of radio links in the preparation set can be different for each NodeB, which means that different NodeBs do not need to be synchronized. Both the UE and the corresponding NodeB are responsible for keeping the synchronization of prepared radio links via the control channel. When the active radio link is handed over to one of the prepared radio links the UE has to send its uplink transmissions and receive its downlink receptions according to the synchronization of the new radio link.

The UE is power controlled by the active NodeB that the UE is actually communicating with. However, the other NodeBs may also listen to the transmission of the UE and send back power control commands to the UE on the control channel. These power control commands are not followed by the UE, they are used only to keep an estimate of the proper power level to each NodeB, which can be used to quickly adjust to the right power when a handover to a new Node B occurs. However, the use of this power estimate is optional.

Figure 7:
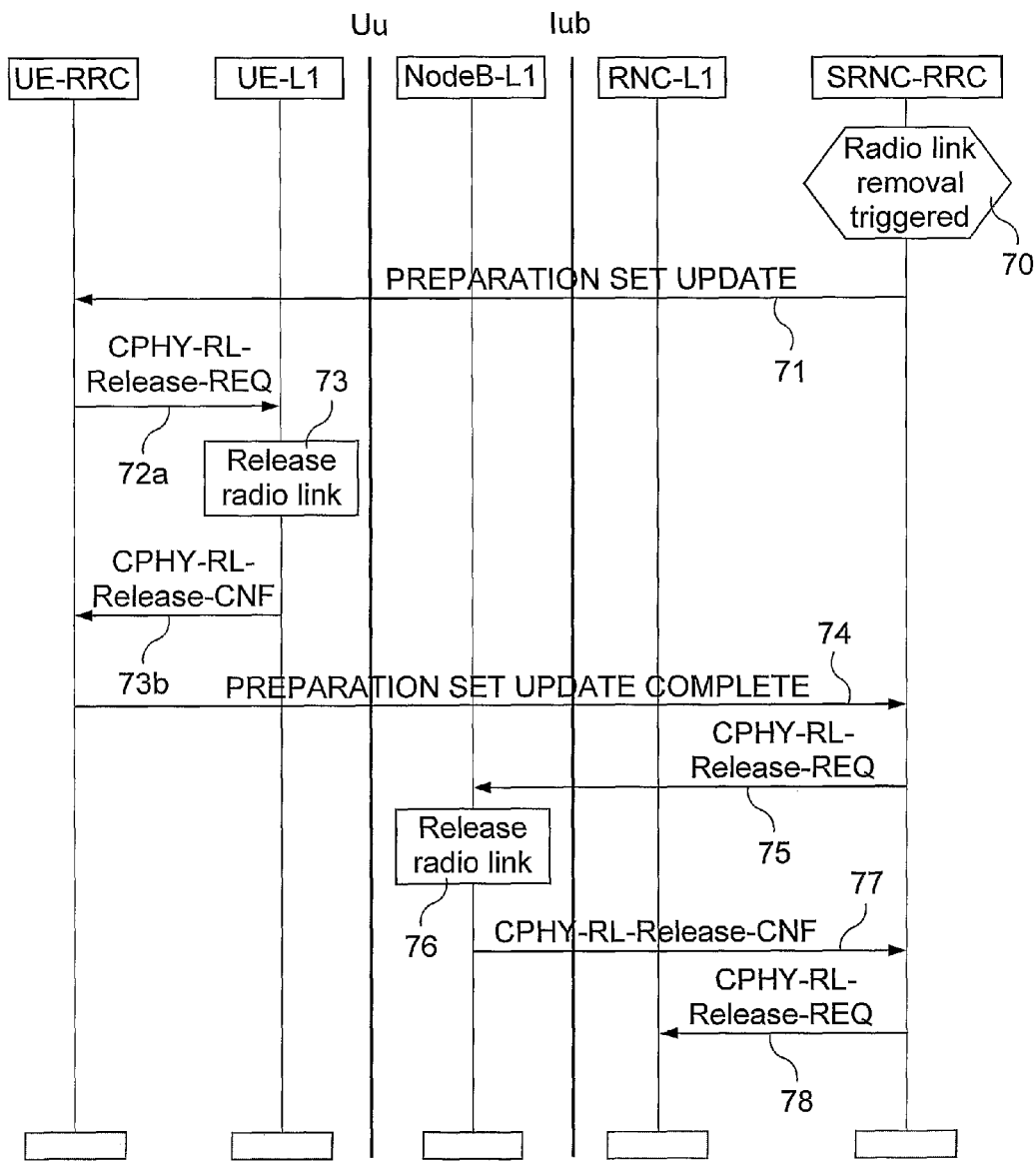
FIG. 7 is a chart of signals sent during the prior art soft handover radio link removal.

The message chart of removing a radio link from the preparation set is shown in FIG. 7. The process is the same as used in the case of the soft handover, with the exception of the messages being modified for indicating that a radio link in prepared state is to be removed.

In more detail, the signalling is triggered by the SRNC decision 70 of removing one of the preparation set radio links. The SRNC-RRC sends 71 a Preparation Set Update message to the UE-RRC. The UE-RRC commands 72a the UE-L1 to release 73 its receiver of the link to be released and the receiver confirms 72b the release. Then the UE-RRC confirms 74 the release by the message Preparation Set Update Complete. Next, the SRNC-RRC commands 75 the NodeB to deactivate 76 the data channel of the radio link by a command CPHY-RL_-Release-REQ, and receives a confirmation 77 CPHY-RL_-Release-CNF from the NodeB. Last, the RNC-RRC commands 78 the RNC-L1 to release the data channel.

Figure 8A:
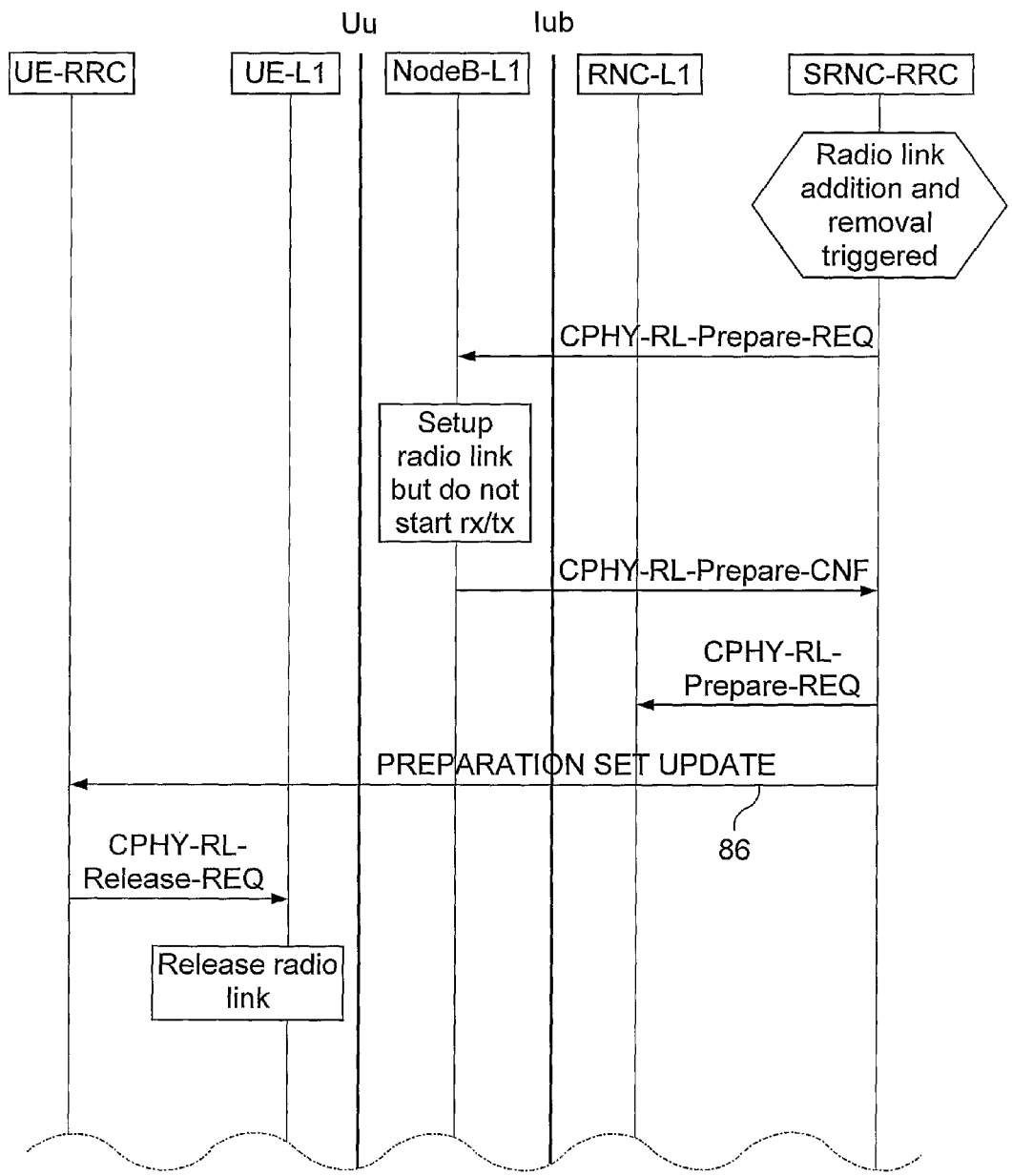
FIG. 8a and 8b is one chart, split over two pages, of signals sent during the prior art soft handover combined radio link addition and removal.
Figure 8B:
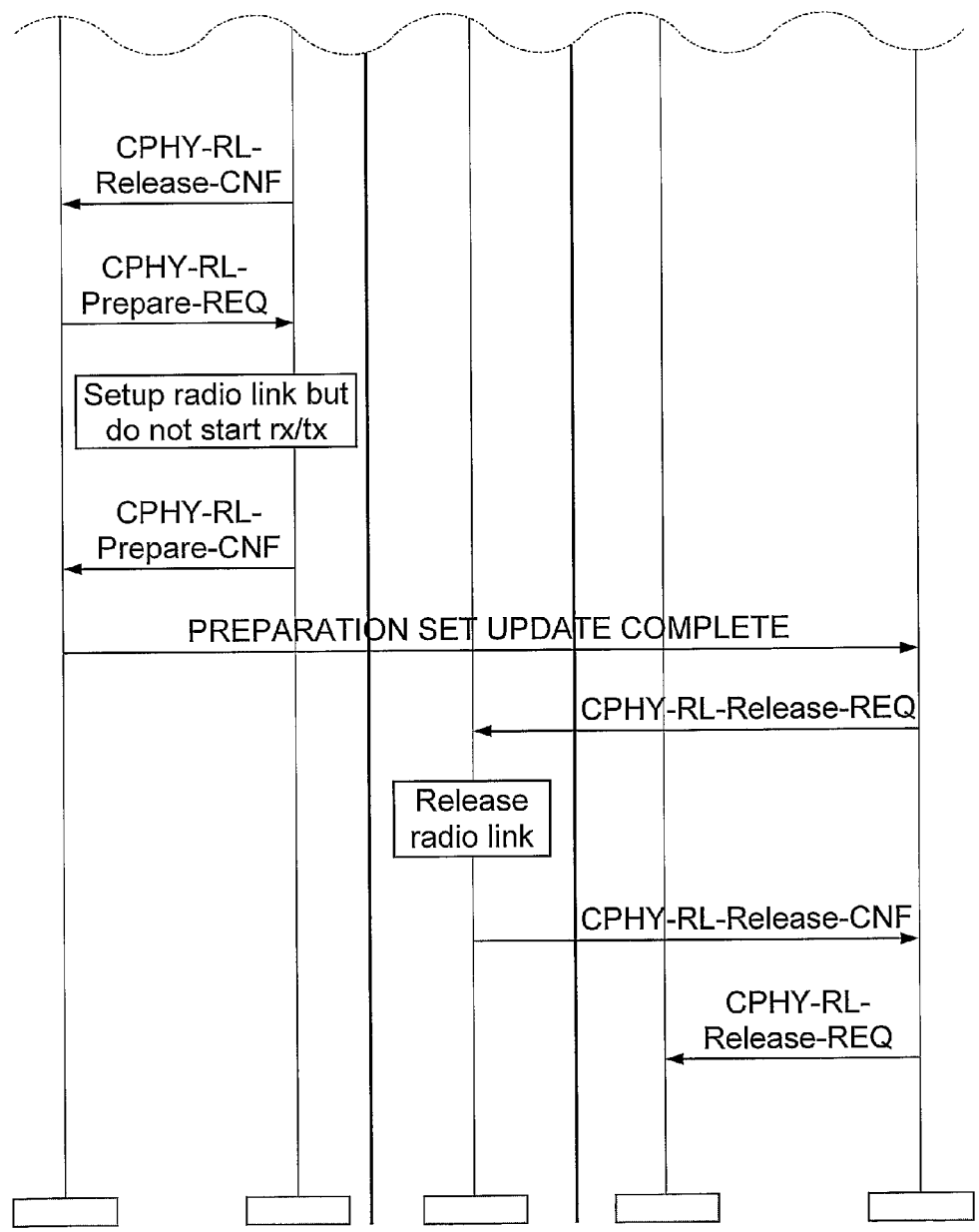

Finally, the process of combined radio link addition and removal is shown in FIGS. 8*a* and 8*b*. This is obtained as a combination of the radio link addition of FIG. 6 and removal processes of FIG. 7. In the combined process of FIGS. 8*a* and 8*b*, the Preparation Set Update message from the SRNC-RRC to the UE-RRC is a command 86 of both preparing a radio link to a new NodeB and of releasing a radio link to an old NodeB.

The Inventive Smooth Hard Handover

Figure 9A:
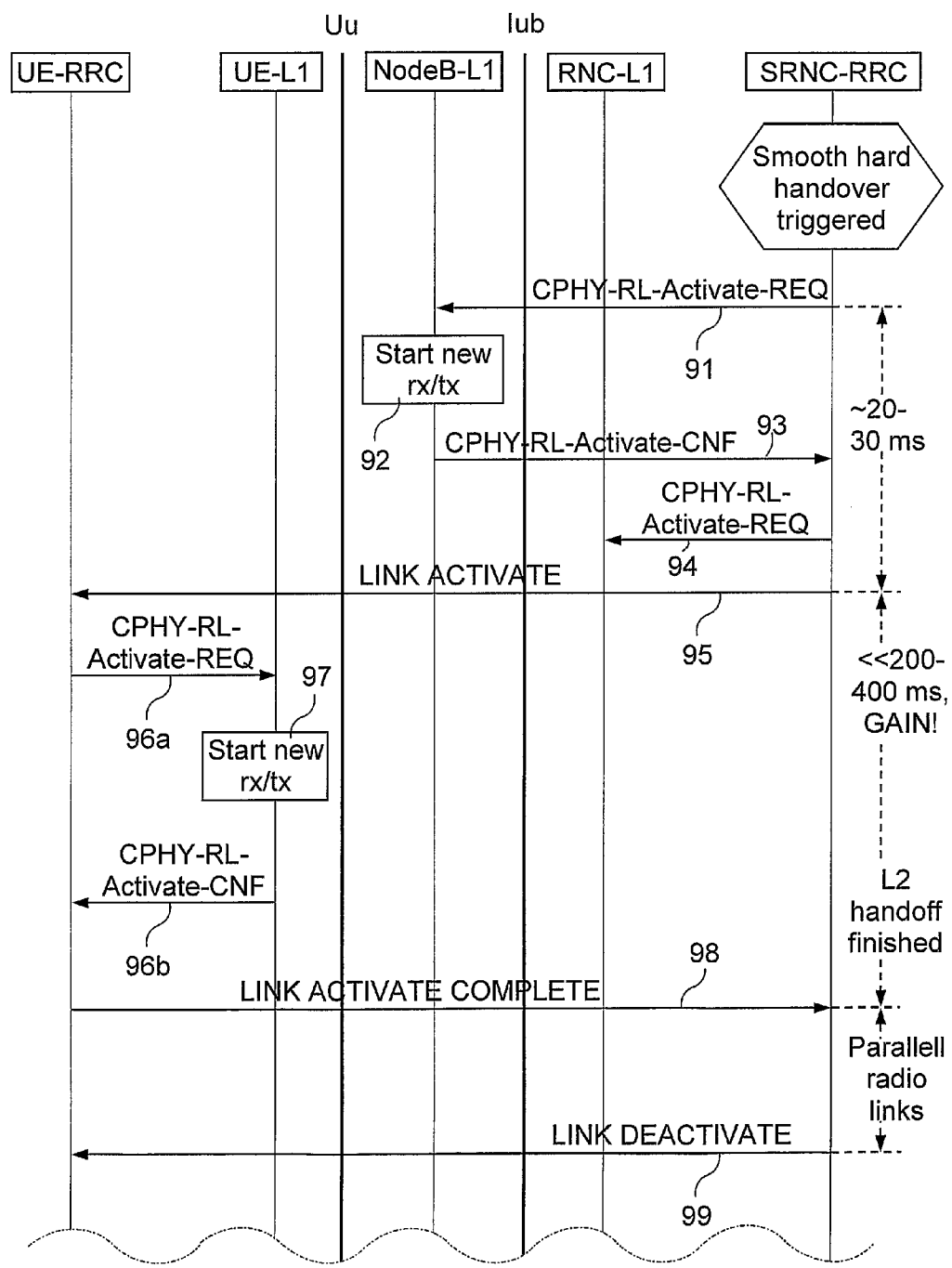
FIG. 9a and 9b is one chart, split over two pages, of signals sent during the inventive smooth hard handover.
Figure 9B:
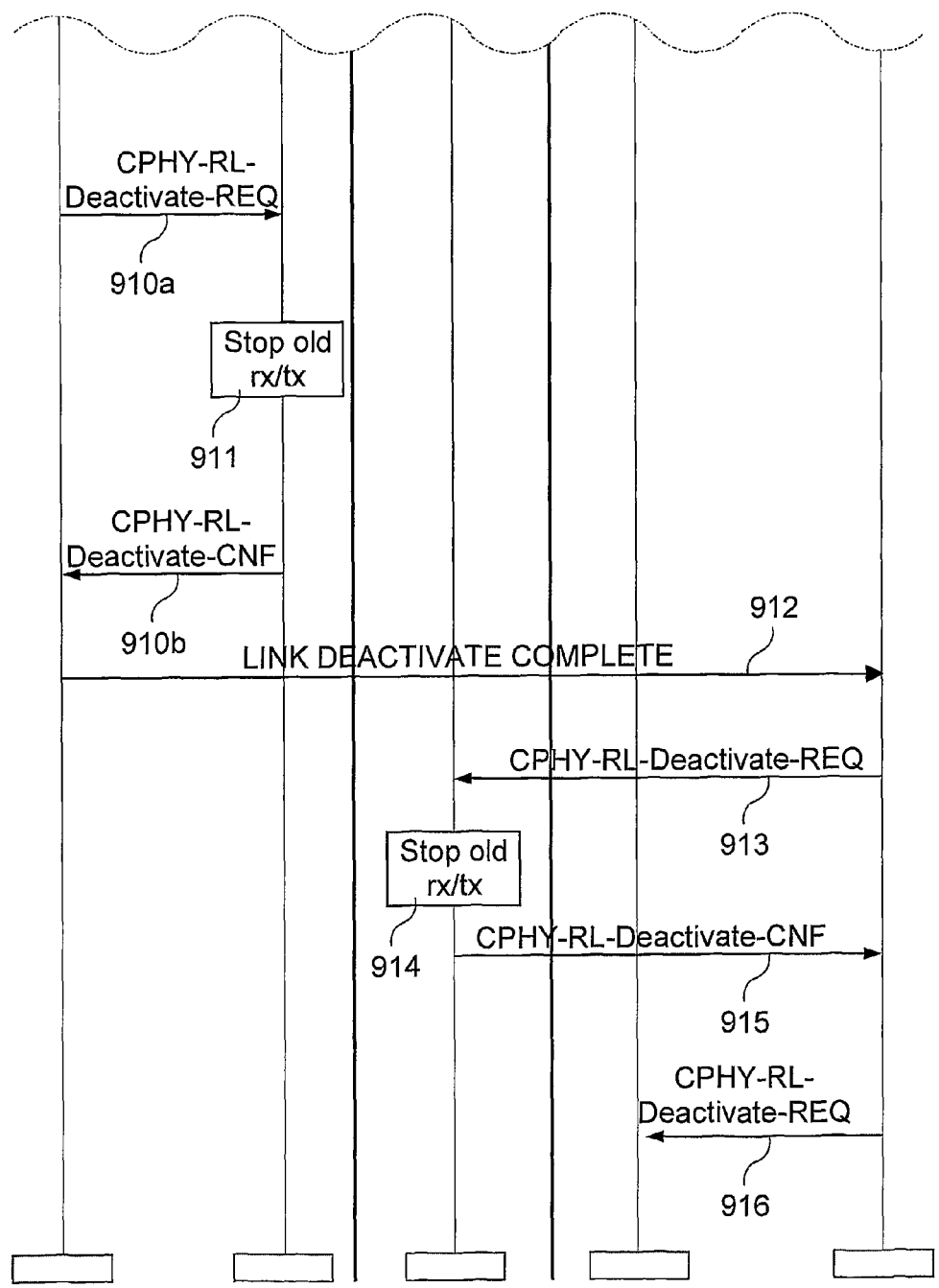

The message chart of the smooth hard handover process is shown in FIGS. 9*a* and 9*b*. The first part of the process, disclosed in FIG. 9*a*, which is associated with the radio link setup 91-94 at the new NodeB, is roughly the same as the hard handover scheme of FIGS. 5*a* and 5*b*. A difference is though that according to the Smooth Hard Handover of the present invention the actual radio link has been prepared when the new NodeB was added to the preparation set. Therefore, at the actual handover the radio link only needs to be activated, which will result in the start of reception and transmission of user data at the new NodeB. This will save some delay compared to hard handover, but it is not expected to be significant, since the delay of the radio link establishment process itself is not significant either (~20-30 ms) and it is determined by the signalling delay between the RNC and NodeB. The expected delays are indicated to the right of the signalling chart in FIGS. 9*a* and 9*b*.

The rest of the inventive smooth hard handover process that is associated with the actual link change is significantly different compared to the prior art hard handover scheme. For the smooth hard handover a new message, the LINK ACTIVATE message 95, is introduced and sent by the RNC to the UE to trigger the handover at the UE. The UE activates 96*a*, 97 the radio link to the new NodeB, which means that the UE starts receiving 97 on the new link and it immediately sends a LINK ACTIVATE COMPLETE 98 back to the RNC. At this point the UE has parallel radio links with both NodeBs and the L2 handover process can be considered finished, since user data traffic may start to flow on the new link. The old radio link can be kept until pending packets in buffers are transmitted. When the old radio link can be deactivated the RNC sends a LINK DEACTIVATE message 99 to the UE, which triggers the UE to stop receiving 910, 911 on the old link. The UE confirm the deactivation by sending a LINK DEACTIVATE COMPLETE message 912 to the RNC. Then, the RNC instructs 913 the old NodeB to deactivate the radio link, which, in turn, stops transceiving 914 and confirms 915 this to the RNC. Finally, the RNC deactivates 916 its own link to the old NodeB.

The deactivation of the old link can be initiated also by the UE. It should be noted that the old link is not released during the smooth hard handover process, it is only deactivated but it still remains in the preparation set until a separate decision on releasing it is taken.

During the handover transition, i.e. the period when radio links to both the old and new NodeB are active, the UE is power controlled by both NodeBs. If the UE is able to set its transmit power levels differently toward the two NodeBs it sets the power to each link individually according to received power control commands. If the UE is not able to set power levels individually then it uses the following strategy to set its power. It increases power if any of the NodeBs command for an increase and decreases power if all NodeBs instruct for a decrease. Regarding downlink transmit powers, the UE may control the transmit power of each NodeB separately or it may send only one common power control command to all NodeBs, in which case a power increase is commanded if the received power level from any of the NodeBs was too weak and a power decrease is commanded if the received power level from all NodeBs were high enough. After the handover is finished the UE will be power controlled only by the active NodeB.

The L2 connection can be maintained continuously during the handover in the case when the L2 protocols are located in the RNC. Note also in the figure that the UE does not perform a L2 link reestablishment with the RNC as it was the case with the original hard handover scheme.

When comparing the LINK ACTIVATE process of the smooth hard handover chart of FIGS. 9*a* and 9*b* and the PHYSICAL CHANNEL RECONFIGURATION process of the original hard handover scheme, the inventive smooth hard handover process will be found to be simpler than that of the original hard handover. This suggests that a significant gain in handover delay can be achieved with smooth hard handover. The main advantage of smooth hard handover process is that the radio link is basically continuous during the handover due to the make-before-break type of BS change. There is no need for radio link setup, radio link synchronization and L2 link reestablishment during the handover. Therefore, the delay associated with the link change in case of SHH is expected to be significantly smaller even than the active set update process (<<200-400 ms).

Because of the make before brake in the smooth hard handover process it could also be compared to the soft handover. A significant difference is though that for the soft handover case there need to be a network node splitting stream of data in the direction to the UE MS to be received by several NodeBs and in the direction from the mobile station data received in parallel over several nodes combining the data into one stream. For the smooth hard handover, no such splitting and combining is needed.

Figure 10:
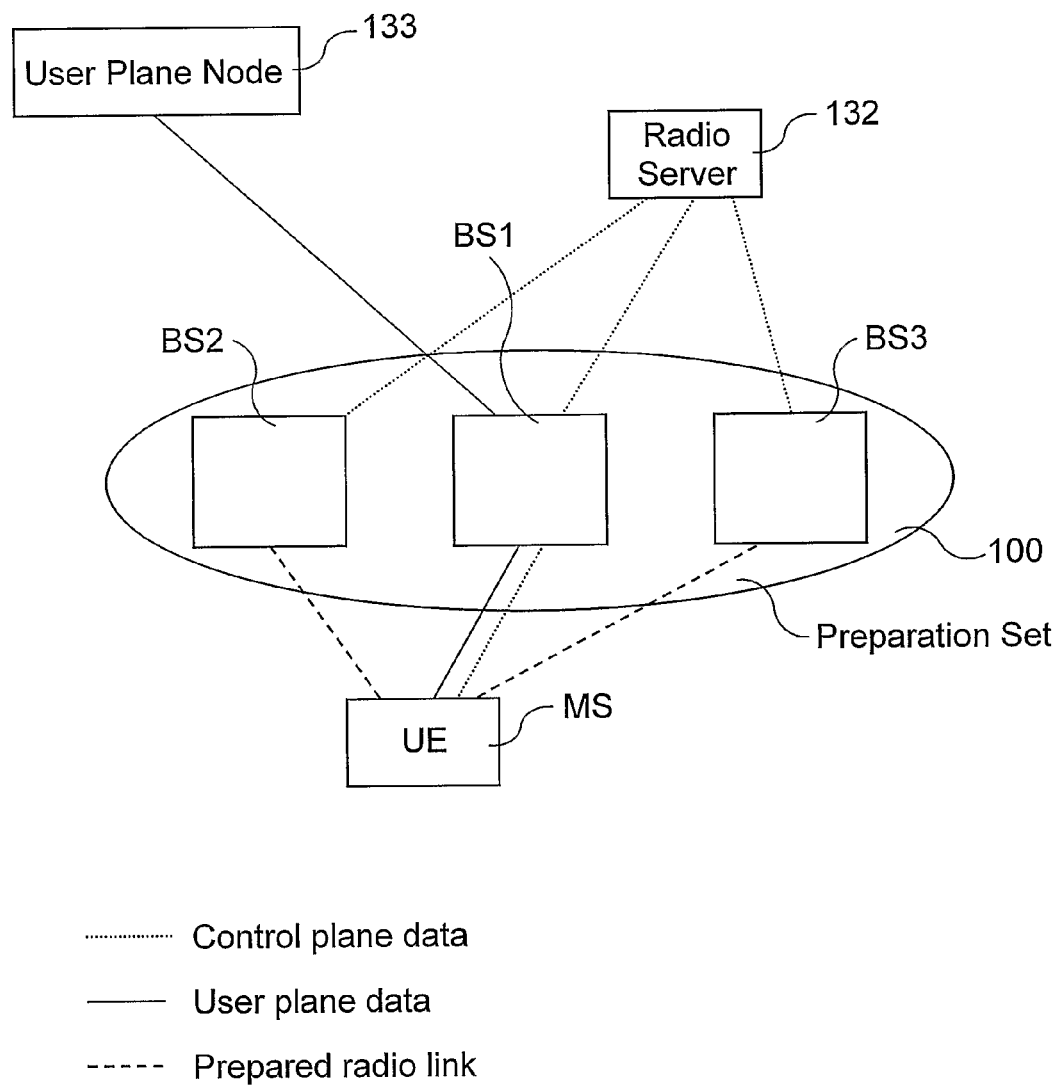
FIG. 10 is a block diagram of an evolved WCDMA architecture in which radio protocol layer 2 is terminated in NodeB.

Embodiments of Present Invention as Implemented in an Evolved WCDMA Architecture Having NodeB Terminated Radio Protocols Further signalling charts of the inventions will be disclosed as implemented in an evolved WCDMA architecture having the current RNC functions split into two nodes. FIG. 10 discloses the nodes of the evolved radio access network. The RS node 132 (Radio Server node) performs the radio resource control functions. FIG. 10 further discloses NodeBs BS1-BS3 and an UE MS. In the example the NodeBs BS1-BS3 are included in the preparation set 100 for the UE MS and the first of the NodeBs BS1 supports an active radio link with the UE MS. The user data transmission link is indicated in FIG. 10 with a continuous line from the UE MS to the first NodeB BS1 over the active radio link and further to user data plane node 133. The prepared radio links between the UE MS and the second and third NodeBs BS1-BS3 of the reparation set are indicated with dashed lines. The RS node 132 controls links to the preparations set NodeBs BS1-BS3 and the active radio link to the UE MS which all are indicated with dotted lines.

In the evolved architecture of FIG. 10 the user plane L2 protocols are moved to the NodeBs BS1-BS3.

Control of the Preparation Set

Figure 11:
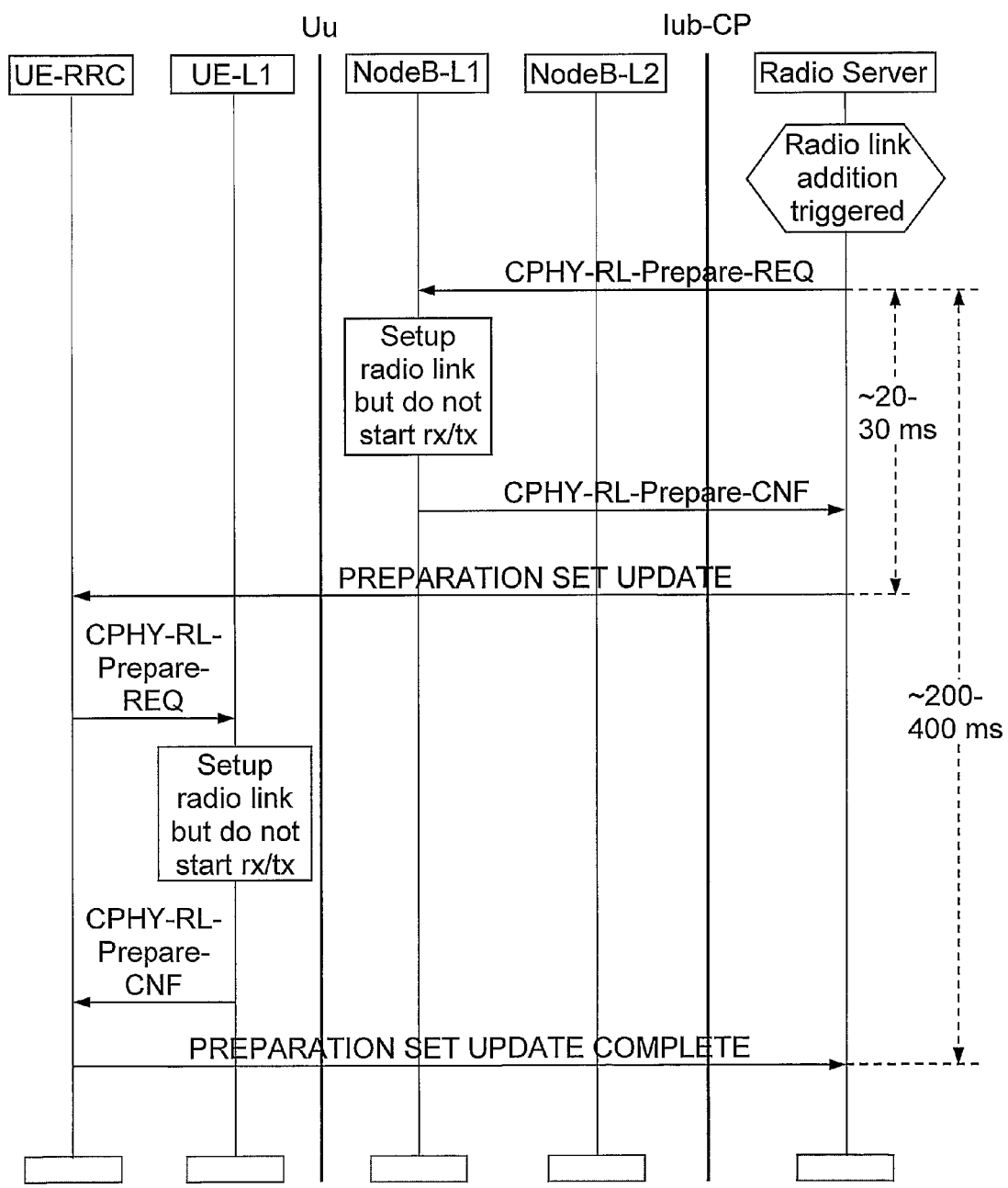
FIG. 11 is a chart of signals sent during the present invention radio link addition as performed in an architecture according to FIG. 10.

The message chart for adding a new radio link to the preparation set, assuming NodeB terminated radio protocols, is shown in FIG. 11. The message chart is basically the same as that of the RNC terminated case. A difference is that in the NodeB terminated case the L1 radio link setup in the RNC is eliminated, which could result in some minimal delay savings. However, the overall delay of preparation set update in the NodeB terminated and RNC terminated cases are expected to be roughly the same.

Figure 12:
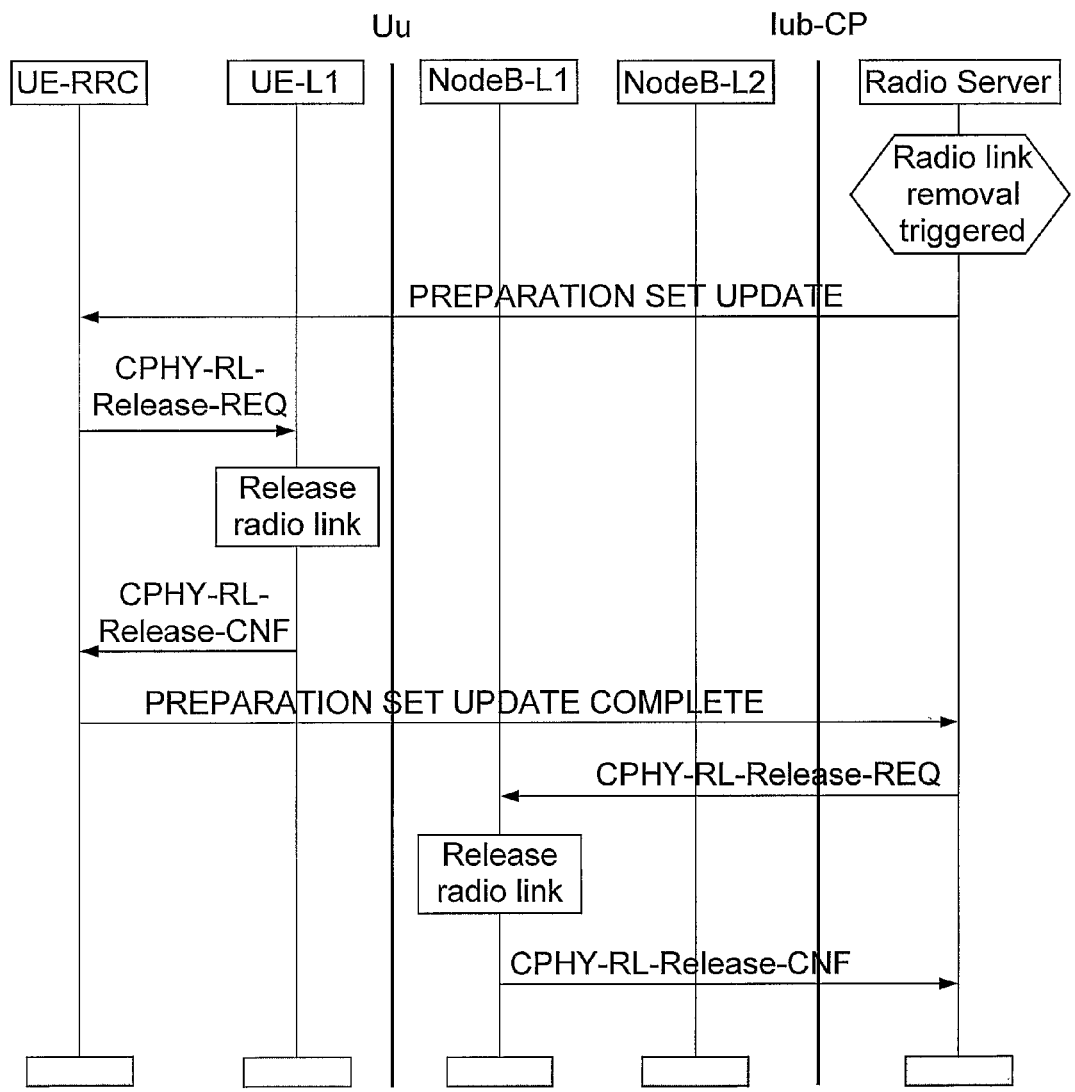
FIG. 12 is a chart of signals sent during the present invention radio link removal as performed in an architecture according to FIG. 10.
Figure 13:
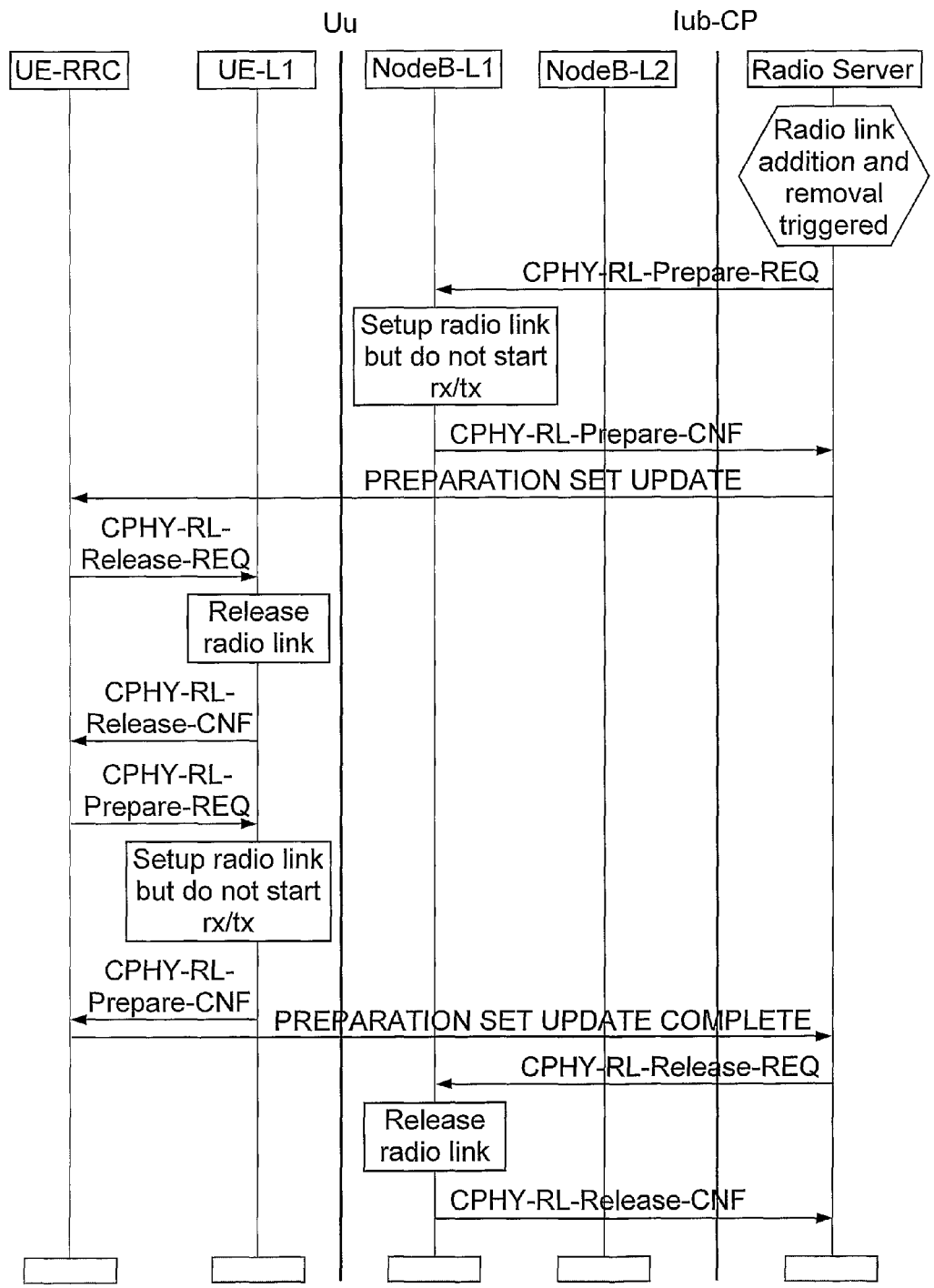
FIG. 13 is a chart of signals sent during the present invention combined radio link addition and removal as performed in an architecture according to FIG. 10.

The message charts for radio link removal and combined radio link addition and removal are shown in FIG. 12 and in FIG. 13, respectively.

The Inventive Smooth Hard Handover

Figure 14A:
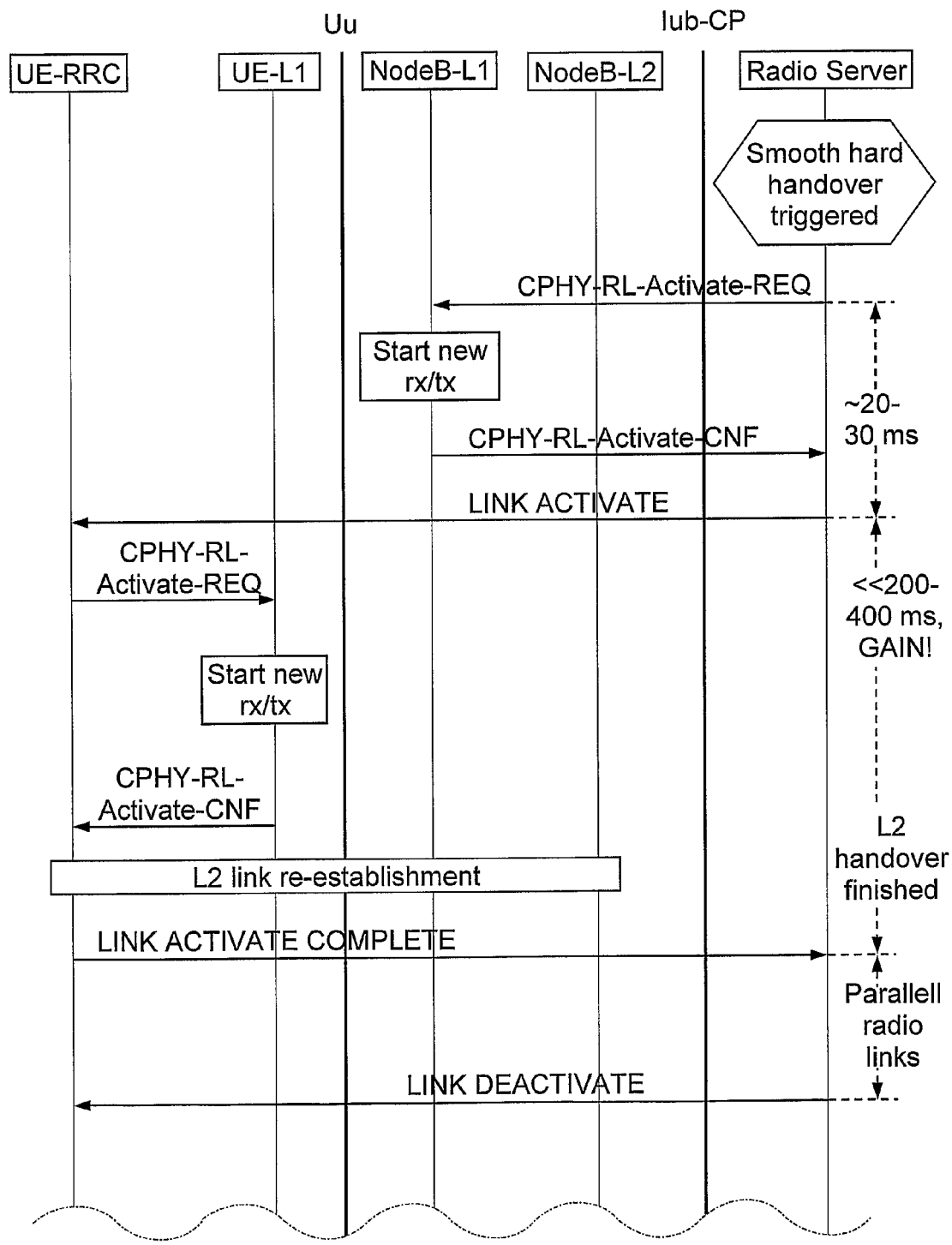
FIGS. 14a and 14b is one chart, split over two pages, of signals sent during the present invention smooth hard handover as performed in an architecture according to FIG. 10.
Figure 14B:
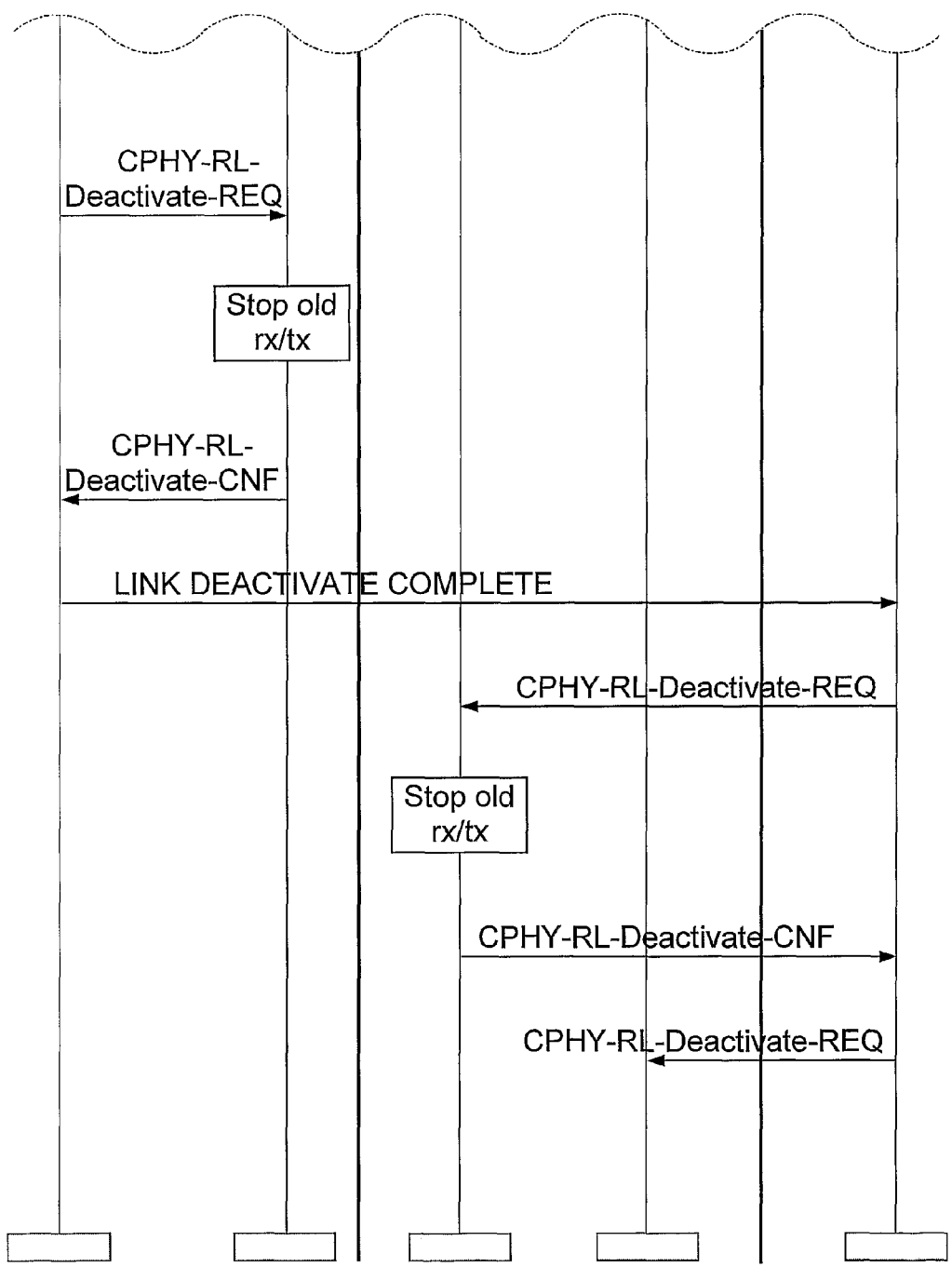

The message chart of the smooth hard handover process in case of NodeB terminated radio protocols is shown in FIGS. 14a and 14b. The difference compared to the RNC terminated case is that there need to be a L2 link reestablishment between the UE and the new NodeB during the handover process and the L2 buffers may also have to be moved. However, the moving of L2 buffers is typically not needed since pending packets at the old NodeB can be transmitted on the old radio link, which remains active in parallel with the new link during the transition. Otherwise the smooth hard handover process is the same as when implemented in WCDMA with RNC terminated radio protocols. The L2 link setup adds some additional delay to the overall handover process compared to the RNC terminated case. However, the overall delay of the handover process is expected to be in the same order in both cases.

Figure 15:
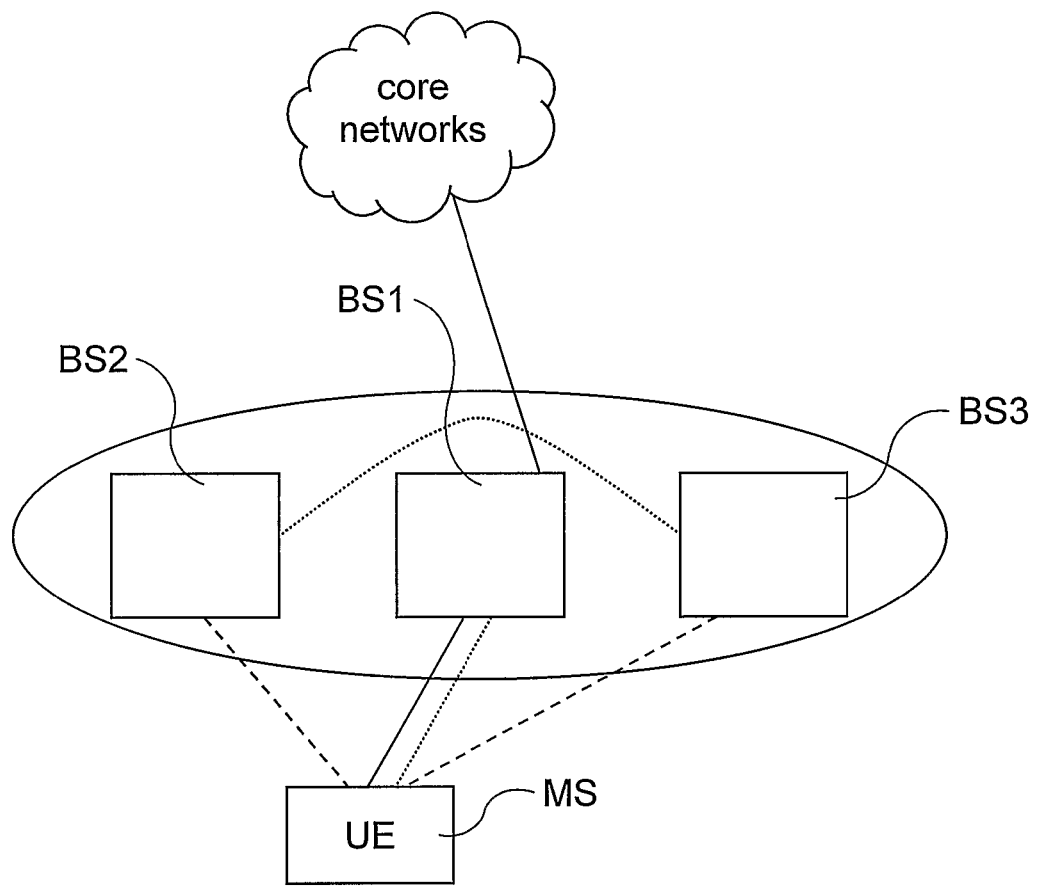
FIG. 15 is an alternative system architecture in which radio protocol layer 2 is terminated in NodeB.

Alternative Architecture for NodeB Terminated Radio Protocols Without Radio Server Node In case of NodeB terminated radio protocols the architecture can be further simplified by removing the Radio Server node. The simplified architecture is disclosed in FIG. 15. The NodeBs can communicate directly with each other. When the present invention is implemented in the architecture of FIG. 15, decisions about the addition/removal of NodeBs to/from the preparation set and the decision about the actual handover are made by the UE MS. The UE MS commands the NodeB BS1-BS3 to prepare, activate or deactivate its corresponding radio link. Recall that these commands were sent by the RNC or Radio Server node in the previous two scenarios. The RRC protocol is also moved from the Radio Server to the NodeB BS1-BS3.

Control of Preparation Set

Figure 16:
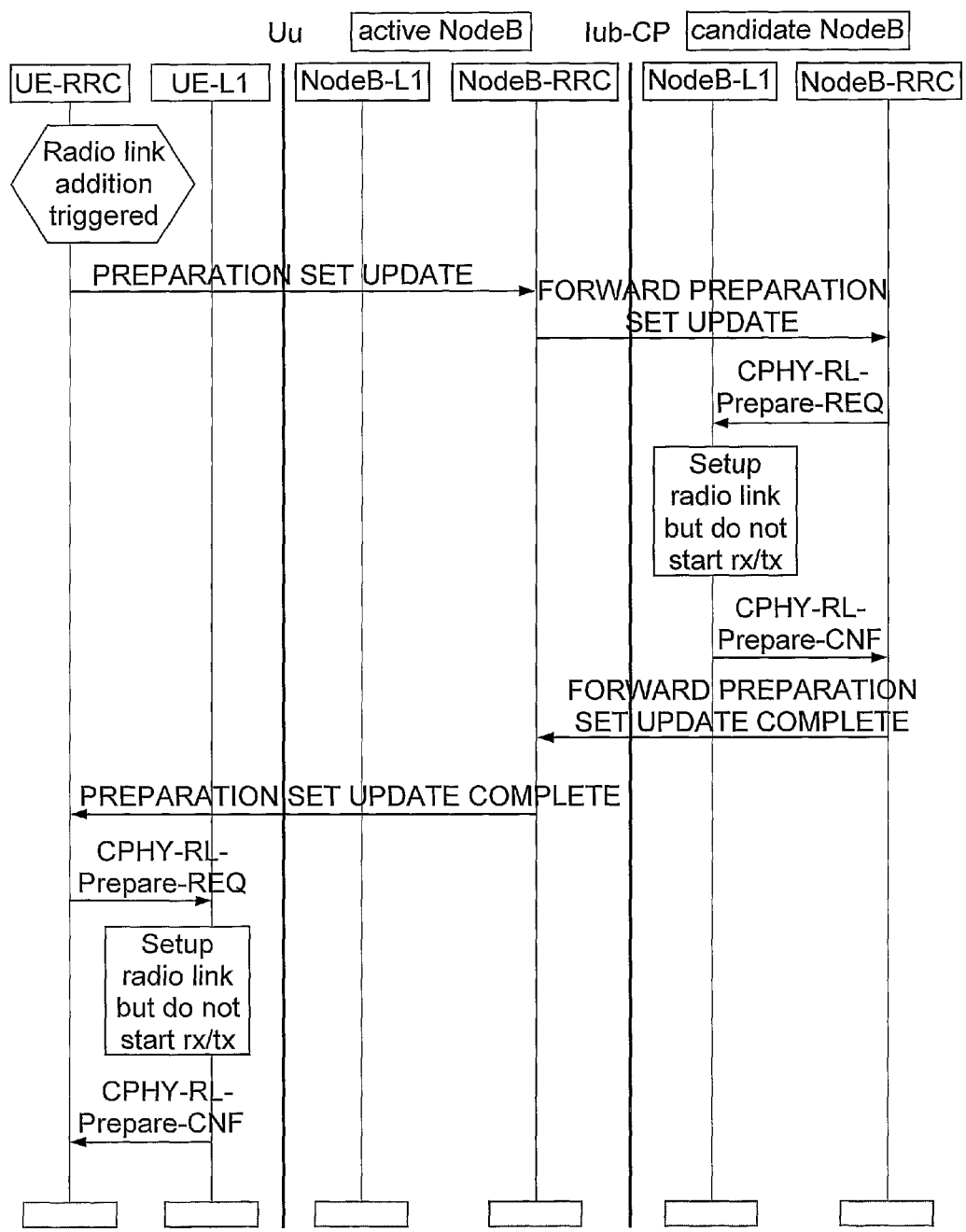
FIG. 16 is a chart of signals sent during the present invention radio link addition as performed in an architecture according to FIG. 15.

The message chart of adding a new radio link to the preparation set is shown in FIG. 16. The radio link addition is triggered in the UE and the corresponding PREPARATION SET UPDATE message is sent to the NodeB that the UE MS has the active radio link with. The active NodeB forwards the request to the candidate NodeB via the fixed network. The candidate NodeB prepares the radio link without start of active transceiving and confirms this to the UE via the active NodeB. Last the UE prepares the radio link with the candidate NodeB.

Figure 17:
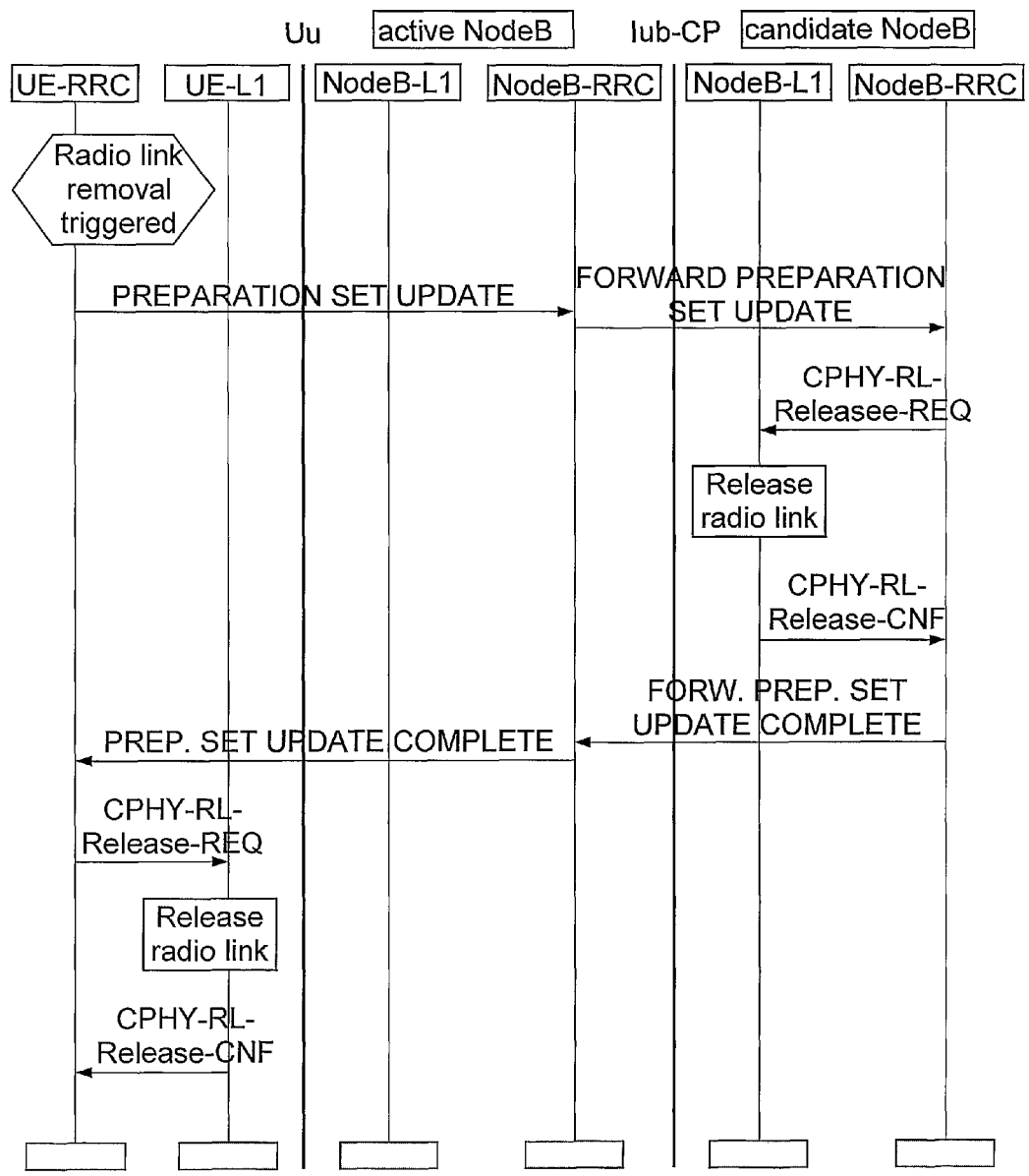
FIG. 17 is a chart of signals sent during the present invention radio link removal as performed in an architecture according to FIG. 15.

The message chart for radio link removal is shown in FIG. 17. The UE initiates the removal by sending a command via the active radio link and the active NodeB forwards the command via the fixed network to the NodeB that shall be released. Confirmation on the release is sent back to the UE from the release NodeB the same way. Last the UE releases the prepared radio link.

Smooth Hard Handover

Figure 18A:
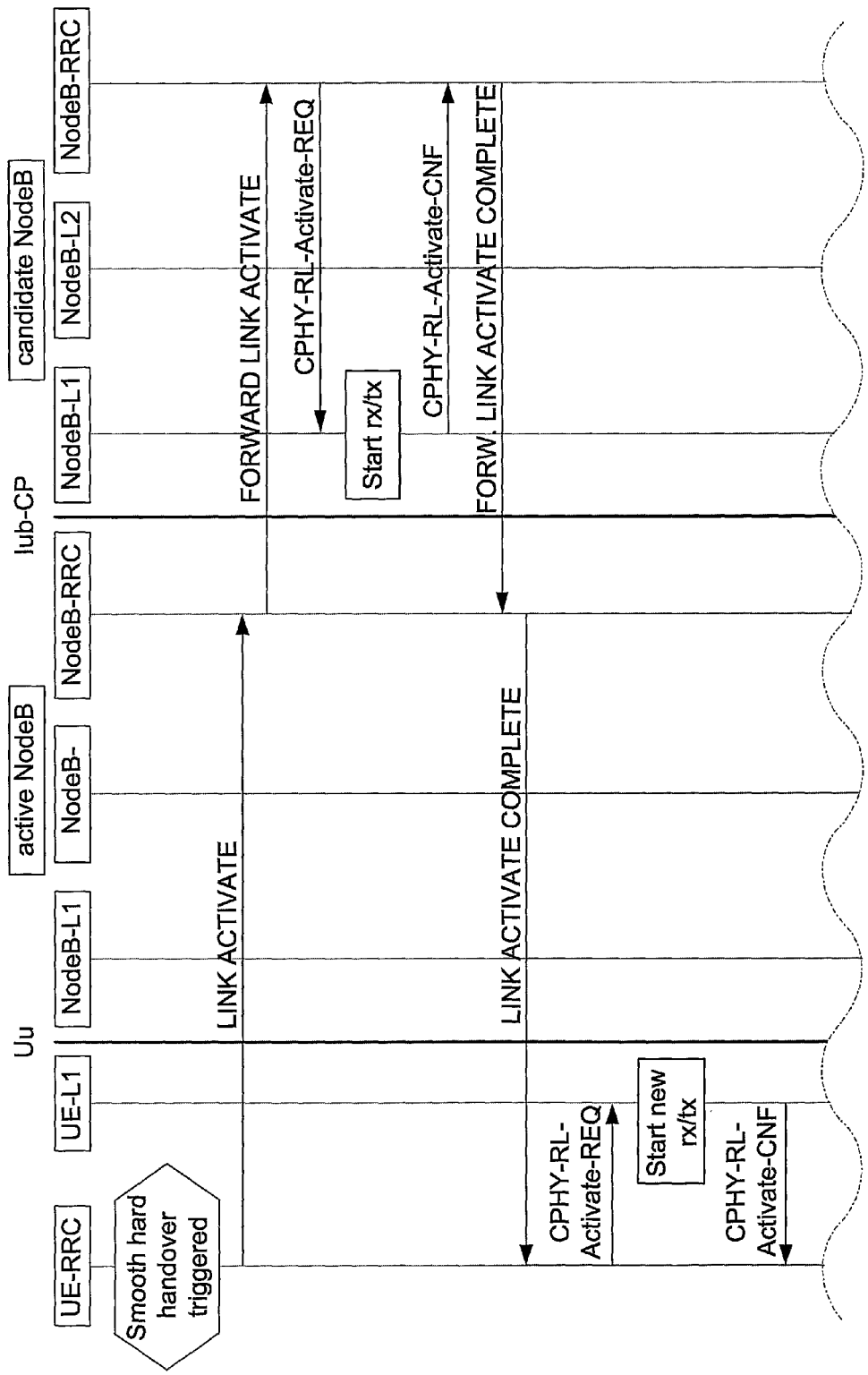
FIGS. 18a and 18b is one chart, split over two pages, of signals sent during the inventive smooth hard handover.
Figure 18B:
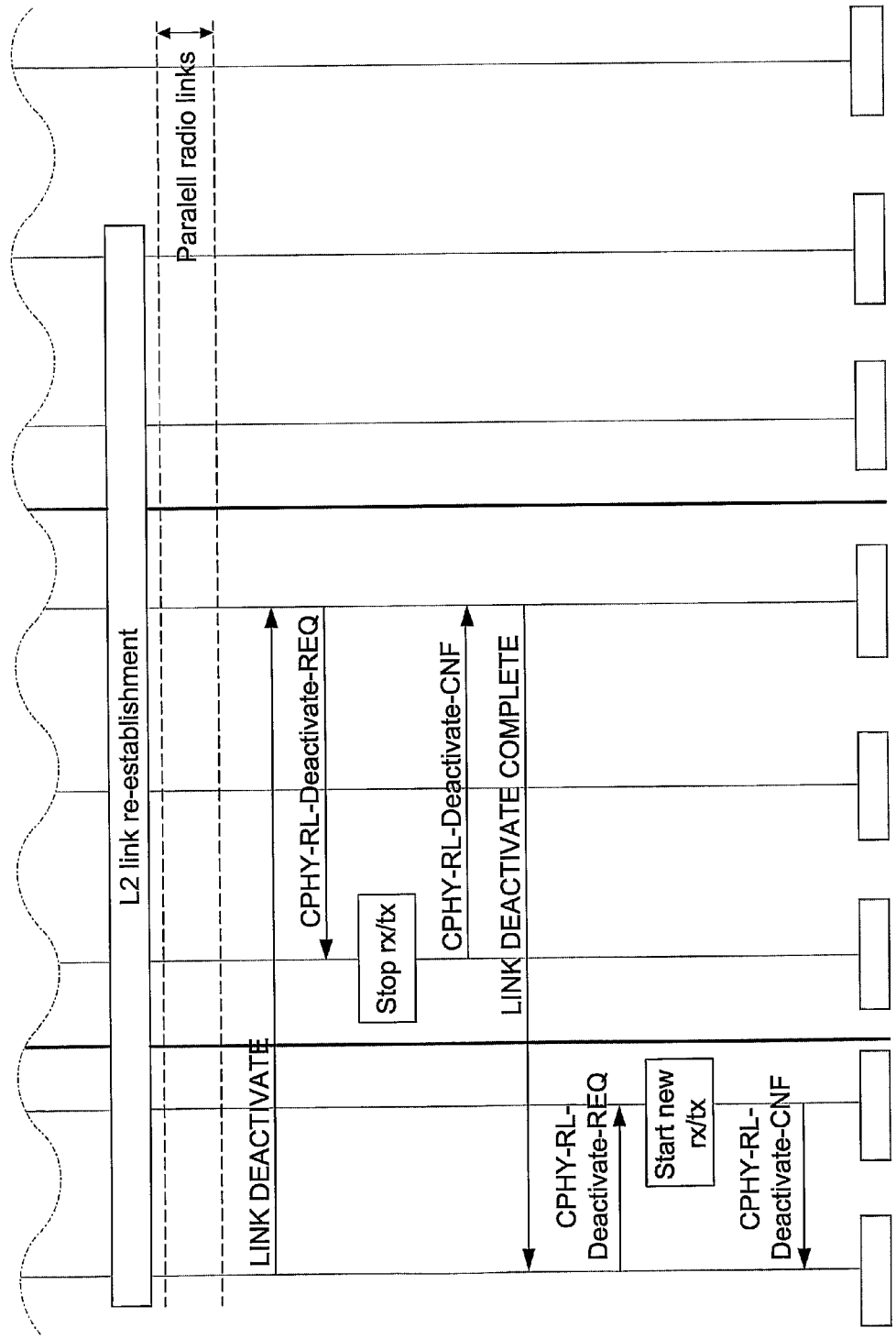

In FIGS. 18a and 18b the smooth hard handover process is disclosed. It is initiated by the UE triggering the handover, in FIG. 18a. The candidate NodeB is commanded by the UE to activate its prepared radio link via the already established active radio link. Not until the new active radio link is established the old active radio link is released.

Alternatively, to the signalling charts of FIGS. 16, 17 and 18a&b it is possible that the UE sends the request directly to the candidate NodeB using the random access channel.

General Remarks to the Methods

In the signalling charts of the smooth hard handover the new active radio link is taken into use before the old active radio link is released. The make-before-brake transition is preferred because it being smooth and safe. As an alternative, a break-before-make solution may be implemented, meaning the old active radio link is released before a new radio link is activated.

Conventional cellular radio networks mobility management functions involves a network switching for changing the streams of data between the established links via an old and new base station at handover. For implementation of the present invention such a mobility management function is assumed to present in the network and accordingly the data stream in direction to the mobile station is switched from one base station to another during the handover. A difference is though that at the make-before-brake transition the links are established before the data streams are switched.

Mobile Station

Figure 19:
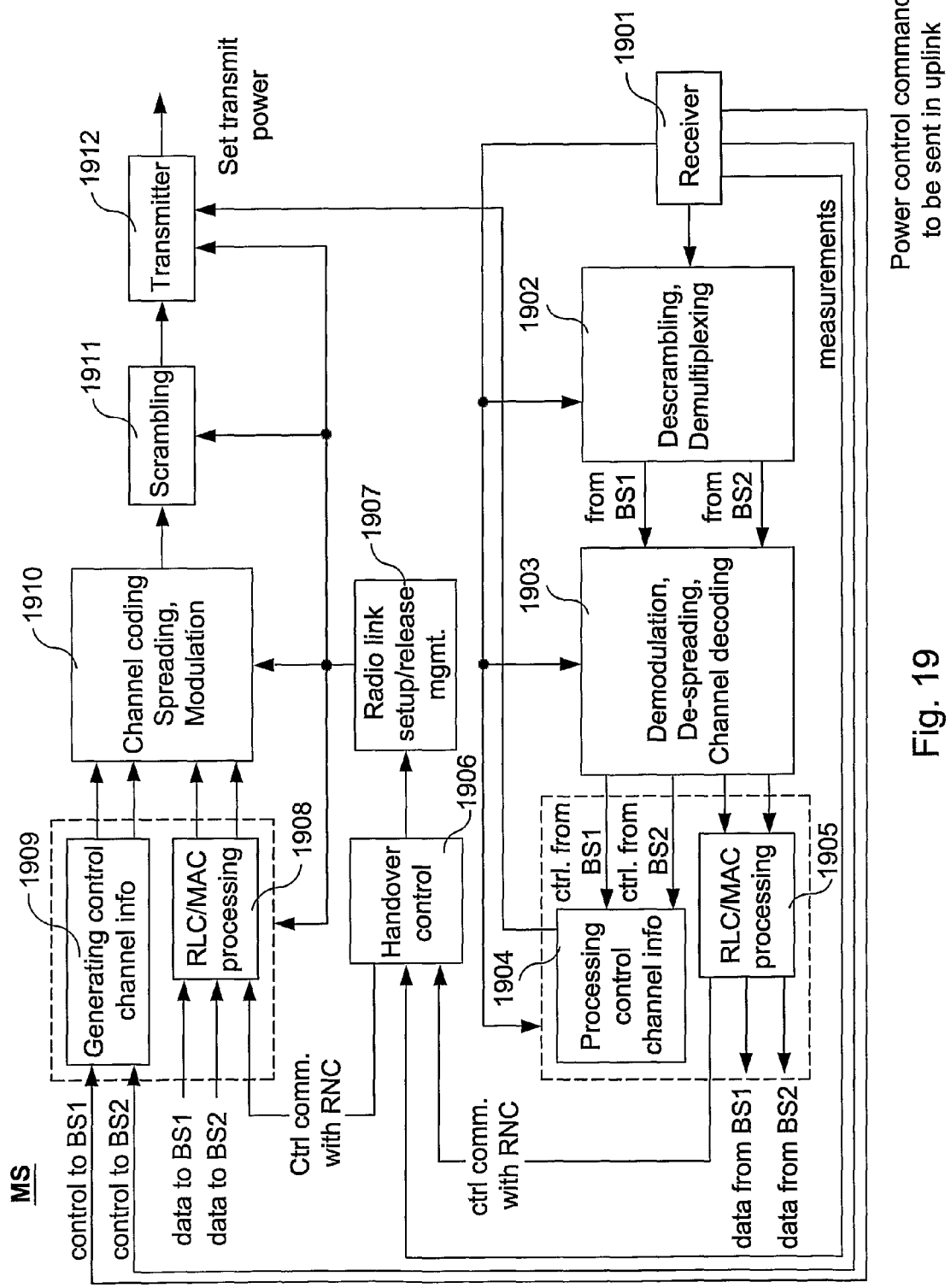
FIG. 19 is a block diagram of parts of a mobile station structure relevant for the invention.
Figure 20:
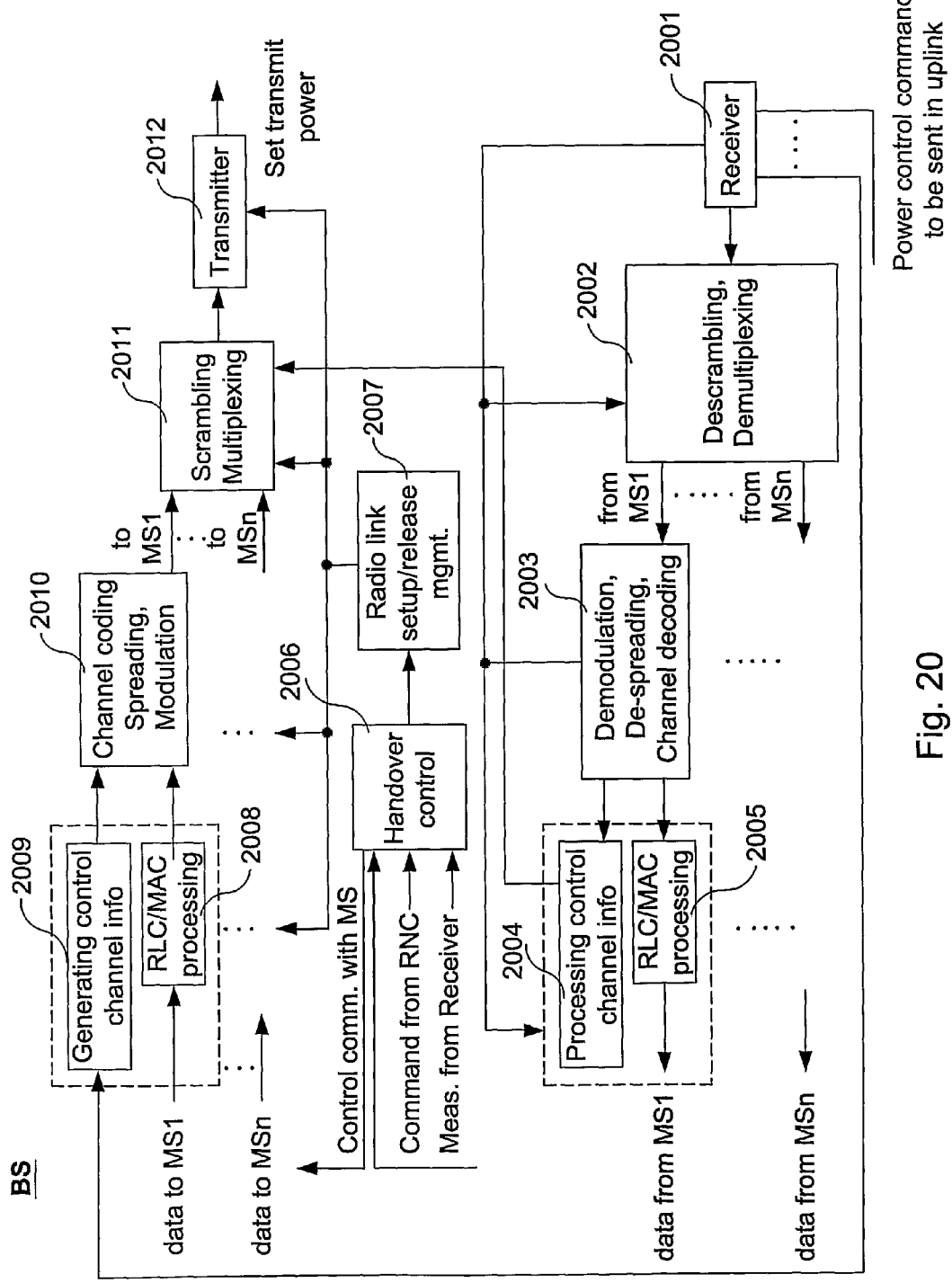
FIG. 20 is a block diagram of some base station structures relevant for the invention

FIG. 19 is a block diagram of some structures in mobile station MS that is relevant for the present invention. The mobile station comprises a receiver chain 1901-1905, a transmitter chain 1908-1512 and a handover part 1906, 1907 adapted for the smooth hard handover operation. First in the receiver chain a receiver unit 1901 receives the physical signal, keeps synchronization of the physical channel, measures signal strength and interference and performs any other physical layer functions that are necessary for the correct reception of the signal. The output from the receiver unit 1901 is coupled to a descrambling and demultiplexing unit 1902 that removes the scrambling code added by the various transmitting base stations BS and also demultiplexes traffic channels according to the different base stations BS1-BS3. According to the smooth hard handover scheme the mobile station normally communicates with only one base station BS1 at a time. Only during the handover transition may it have parallel communication with two base stations BS1, BS2. The figure shows the more generic case when there is communication with two base stations BS1,BS2.

Next in the receiver chain 1901-1905 a demodulation, despreading, and channel decoding unit 1903 performs the demodulation, separates the different traffic and control channels by removing the respective spreading codes and it performs channel decoding. The output is the individual data traffic channels and control channels from each base station BS1, BS2, respectively. The data streams received over the traffic channels are fed into the RLC/MAC protocol unit 1905 as well as higher layer control information on logical control channels, while the while layer 1 control information are processed by the control channel processing unit 1904. The control channel process unit 1904 extracts the power control command sent by the base stations BS1, BS2 and feed it to the transmitter unit 1912 last in the transmitter chain 1908-1912. The transmitter unit 1912 is responsible for formulating the correct physical signal, setting the transmit power level according to the received power control commands and sending out the signal over the air interface. The RLC/MAC protocol unit 1905 forwards control commands on preparation of a radio link or the release of it to the handover part (1906-1907).

In the transmitter chain 1908-1912 the blocks have basically the inverse functions of those of the receiver side. Accordingly, data is processed in the RLC/MAC processor unit 1908 and control information for respective receiving base station is handled by control channel generator 1909 and data and control info from both units 1908, 1909 are fed to a channel coding, spreading and modulator unit 1910. A scrambling unit 1911 is next in the transmitter chain and last is the transmitter 1912.

In the handover part 1906,1907 of the mobile station MS a handover control unit 1906 is responsible for managing handovers, preparing radio links and releasing them. The handover control unit 1906 has an output to a Radio Link Setup/Release Mgmt unit 1907, an input from the radio receiver 1901, an input from the RLC/MAC processor unit 1905 in the receiver chain and output to the corresponding node 1908 in the transmitted for receiving and transmitting control data from the network. Hence, the handover control unit 1906 may have a control communication with the RNC 32 via the RLC/MAC protocols and it may receive commands from the RNC 32, on update of the preparation set or to perform a handover.

Alternatively, when there is neither RNC 31 nor Radio Server node 132 in the network, the Handover Control unit in the mobile station MS will decide about the preparation set base stations and any handovers itself based on measurements received from the receiver unit 1901 and optionally measurements received from the network over the active radio link.

When the handover control unit 1906 has to add or release a channel in the prepared state it instructs the Radio Link Setup/Release Mgmt. unit 1907 to prepare or release the radio channel in all other units on the receiver and transmitter sides. Accordingly, when a handover is to be performed the handover control unit 1906 first instructs the Radio Link Setup/Release Mgmt. unit 1907 to activate the prepared radio channel and secondly to deactivate the old active radio link, and the Radio Link Setup/Release Mgmt. unit 1907 control all other units on the receiver and transmitter chains to do so.

With respect to the signalling diagrams disclosed above with connection to the different system architectures, the handover control unit handles the messages on the UE-RRC protocol layer while the Radio Link Setup/Release Mgmt. unit 1907 handles the UE-L1 functions.

The physical structure of the base station may be implemented as the structure disclosed in FIG. 19. The functions performed by the different entities of FIG. 19 may be implemented in signalling processor units that may be shared by several of the functional entities. The physical transmitter 1912 and receiver 1901 units should be separate entities and the transmitter and receiver chains 1901-1905, 1908-1912 should also be separate.

Base Station

FIG. 16 is a block diagram of some base station BS structures relevant for the present invention. The base station structure is similar to those in the mobile station. The main difference compared to the mobile station is that the BS includes several pairs of receiver chain 2001-2005 and transmitter chain 2009-2012 each for supporting a radio link with a respective mobile station. In other respects the receiver and transmitter chains 2001-2005, 2009-2012 in the base station BS assigned to one mobile station are very similar to the corresponding chains in the mobile station MS.

Depending on the scenario a Handover control unit 2006 in the base station BS may receive commands from the RNC 32 or Radio Server node 132 on prepare of a radio link, on release of a prepared radio link or on activation of a prepared link or deactivation of an active link The handover control unit 2006 controls the operation according to the commands via a radio link setup/release mgmt. unit 2007 that controls the operation in the various entities in the receiver and transmitter chains 2001-2005, 2008-2012.

The handover control unit 2006 may also receive measurement reports from its own receiver unit 2001, which can be either forwarded to the RNC 32 or, in the scenario when there is no RNC 32 or Radio Server node 132 in the network the measurement reports are used by the handover control unit 2006 for handover decisions. In the later scenario the handover control unit 2006 has control communication with the same function in the mobile station or in other base stations.

The invention claimed is:

1. A handover method for a cellular communications system, wherein transceiving of user data is performed over a first radio link between a mobile station and a first base station, the method comprising the steps of:
   preparing a second radio link for transceiving of user data between the mobile station and a second base station without activating the second radio link to transceive user data, the preparing step including the steps of:
      setting up a dedicated control channel from the second base station to the mobile station;
      transmitting control data from the second base station to the mobile station on the control channel;
      synchronizing a receiver chain in the mobile station to the second base station by receiving the control data; and
      synchronizing a receiver chain in the second base station to the mobile station by receiving transmissions from the mobile station on the first radio link;
   deciding to hand over the transceiving from the first to the second base station;
   handing over the transceiving from the first to the second base station; and
   immediately transceiving user data on the already prepared second radio link.

2. The method of claim 1, further comprising evaluating neighboring base stations for inclusion in a preparation set of base stations in which one or more base stations prepare a radio link for transceiving of user data with the mobile station without activating the prepared radio link to transceive user data.

3. The method of claim 1, further comprising the steps of:
   selecting one or more new base stations to prepare a radio link with the mobile station for transceiving of user data with the mobile station without activating the prepared radio link to transceive user data; and
   releasing prepared radio links in one or more different base stations.

4. The method of claim 3, further comprising considering as candidates for a future handover, only the one or more base stations having a prepared radio link to the mobile station.

5. The method of claim 1, wherein transceiving of user data is started on the second radio link before transceiving of buffered user data is stopped on the first radio link, wherein the user data transmitted in parallel over the first and second radio links differs.

6. The method of claim 5, further comprising the steps of:
   receiving by a receiver unit in the mobile station, first and second radio signals transmitted in parallel on the first and second radio links, respectively, wherein the first and second radio signals carry the different user data;
   descrambling and demultiplexing the first and the second radio signals in parallel by a descrambling and demultiplexing unit in the mobile station, and separately outputting the demultiplexed and descrambled first and second radio signals; and
   demodulating, dispreading, and channel decoding dedicated data channels received in the first and second radio signals by a demodulation, dispreading, and channel decoding unit in the mobile station, and outputting baseband signals of the dedicated data channels containing the different user data.

* * * * *

UNITED STATES PATENT AND TRADEMARK OFFICE
CERTIFICATE OF CORRECTION

PATENT NO. : 7,933,600 B2  
APPLICATION NO. : 11/570613  
DATED : April 26, 2011  
INVENTOR(S) : Miklós et al.

Page 1 of 1

It is certified that error appears in the above-identified patent and that said Letters Patent is hereby corrected as shown below:

On the Title Page, in item (12), under "United States Patent", in Column 1, Line 1, delete "Miklos" and insert -- Miklós --, therefor.

On the Title Page, in item (75), under "Inventors", in Column 1, Line 1, delete "Gyorgy Miklos" and insert -- György Miklós --, therefor.

On the Title Page, in item (75), under "Inventors", in Column 1, Lines 1-2, delete "Andras Racz" and insert -- András Rácz --, therefor.

Signed and Sealed this  
Sixth Day of September, 2011

David J. Kappos  
*Director of the United States Patent and Trademark Office*